US012111558B2

(12) United States Patent
Feng et al.

(10) Patent No.: US 12,111,558 B2
(45) Date of Patent: Oct. 8, 2024

(54) LIQUID CRYSTAL OPTICAL DEVICE, ARRAY, ELECTRONIC PRODUCT, AND DRIVING METHOD THEREOF

(71) Applicant: CHENGDU YETA TECHNOLOGY CO., LTD., Chengdu (CN)

(72) Inventors: Wenbin Feng, Chengdu (CN); Bin Wang, Chengdu (CN); Mao Ye, Chengdu (CN)

(73) Assignee: CHENGDU YETA TECHNOLOGY CO., LTD., Chengdu (CN)

( * ) Notice: Subject to any disclaimer, the term of this patent is extended or adjusted under 35 U.S.C. 154(b) by 35 days.

(21) Appl. No.: 18/188,485

(22) Filed: Mar. 23, 2023

(65) Prior Publication Data

US 2023/0305358 A1    Sep. 28, 2023

(30) Foreign Application Priority Data

Mar. 28, 2022  (CN) .......................... 202210311016.9
Apr. 27, 2022  (CN) .......................... 202210451852.7
Apr. 27, 2022  (CN) .......................... 202210451855.0

(51) Int. Cl.
*G02F 1/29* (2006.01)
*G09G 3/36* (2006.01)

(52) U.S. Cl.
CPC ............... *G02F 1/294* (2021.01); *G09G 3/36* (2013.01); *G02F 2201/12* (2013.01); *G02F 2202/16* (2013.01)

(58) Field of Classification Search
CPC .. G02F 1/294; G02F 2201/12; G02F 2202/16; G09G 3/36
See application file for complete search history.

(56) References Cited

U.S. PATENT DOCUMENTS

| 5,015,075 | A | * | 5/1991 | Ito | G02F 1/163 359/275 |
| 5,311,342 | A | * | 5/1994 | Watanabe | G02F 1/1345 257/691 |
| 5,477,358 | A | * | 12/1995 | Rosenblatt | G02F 1/1396 349/130 |
| 6,016,174 | A | * | 1/2000 | Endo | G02F 1/1368 257/59 |
| 6,066,916 | A | * | 5/2000 | Osada | H05B 33/26 313/504 |

(Continued)

*Primary Examiner* — Benyam Ketema
(74) *Attorney, Agent, or Firm* — Andrew C. Cheng

(57) ABSTRACT

A liquid crystal optical device includes a liquid crystal layer, a first orientation layer, a second orientation layer, a first electrode layer, a second electrode layer, a first transparent substrate, and a second transparent substrate. The second electrode layer includes a conductive line and a plurality of leading-out lines. The conductive line includes a first position and a second position; one end of each leading-out line is connected with the conductive line, the other end thereof is suspended. The conductive line has at least one leading-out position; at least a part of the leading-out position is located between the first and second positions, and at least two of the leading-out positions are different from each other; a resistance between each leading-out position and the first position and a distance between at least a part of each leading-out line in a first direction and the first position satisfies a first condition.

20 Claims, 33 Drawing Sheets

(56) References Cited

U.S. PATENT DOCUMENTS

| Patent/Publication | Date | Inventor | Classification |
|---|---|---|---|
| 6,480,454 B1* | 11/2002 | Wada | G02F 1/13439 369/112.02 |
| 6,909,686 B2* | 6/2005 | Iwasaki | G11B 7/13925 369/112.02 |
| 7,054,253 B1* | 5/2006 | Nomura | G11B 7/13925 369/112.02 |
| 7,839,458 B2* | 11/2010 | Osawa | G02F 1/134309 349/200 |
| 8,675,148 B2* | 3/2014 | Takagi | G02B 30/27 349/139 |
| 10,598,961 B2* | 3/2020 | Shibuya | G02F 1/1313 |
| 10,761,245 B2* | 9/2020 | Shibuya | G02C 7/041 |
| 11,721,898 B2* | 8/2023 | Sun | H01Q 13/206 343/702 |
| 11,860,484 B2* | 1/2024 | Lee | G02F 1/134381 |
| 11,899,336 B2* | 2/2024 | Shibuya | G02B 3/14 |
| 2005/0046777 A1* | 3/2005 | Moon | G02F 1/1345 349/149 |
| 2005/0211986 A1* | 9/2005 | Konno | G02F 1/1345 257/72 |
| 2006/0227283 A1* | 10/2006 | Ooi | G02F 1/134363 349/201 |
| 2007/0127348 A1* | 6/2007 | Ooi | G11B 7/1369 369/112.02 |
| 2007/0183293 A1* | 8/2007 | Murata | G11B 7/13925 369/112.02 |
| 2008/0266473 A1* | 10/2008 | Osawa | G11B 7/13925 349/33 |
| 2009/0015737 A1* | 1/2009 | Jung | G02B 30/28 349/200 |
| 2009/0075044 A1* | 3/2009 | Tsubata | H05B 33/28 430/311 |
| 2010/0225831 A1* | 9/2010 | Takeuchi | G09G 3/3666 345/55 |
| 2012/0120333 A1* | 5/2012 | Chen | G02B 30/27 349/200 |
| 2012/0306826 A1* | 12/2012 | Tsuchi | G09G 3/2011 345/204 |
| 2013/0063406 A1* | 3/2013 | Nishino | G02F 1/1345 345/204 |
| 2014/0028924 A1* | 1/2014 | Yamaguchi | A61B 1/00193 349/1 |
| 2014/0132904 A1* | 5/2014 | Bos | G02F 1/29 349/139 |
| 2014/0375913 A1* | 12/2014 | Jen | G02F 1/29 349/123 |
| 2016/0027800 A1* | 1/2016 | Liu | G02F 1/13458 438/151 |
| 2016/0253001 A1* | 9/2016 | Sugita | G02F 1/13338 345/174 |
| 2018/0031947 A1* | 2/2018 | Shibuya | G02F 1/13 |
| 2019/0187339 A1* | 6/2019 | Shibuya | G02F 1/29 |
| 2021/0041762 A1* | 2/2021 | Ye | G02F 1/29 |
| 2024/0134234 A1* | 4/2024 | Shibuya | G02B 27/0172 |

* cited by examiner

LIQUID CRYSTAL OPTICAL DEVICE, ARRAY, ELECTRONIC PRODUCT, AND DRIVING METHOD THEREOF

TECHNICAL FIELD

The present disclosure relates to liquid crystal optical technologies, and more particularly, to a liquid crystal optical device, a liquid crystal optical device array, an electronic product, and a driving method thereof.

BACKGROUND

Liquid crystal lens is widely used for having an electronically controlled focus. In order to apply the liquid crystal lens to different scenes, it is often necessary to accurately control the potential distribution of liquid crystal lens, so that the liquid crystal lens can form the desired phase distribution. For example, a cylindrical lens can be formed by a parabolic cylinder potential distribution. "Tunable-Focus Cylindrical Liquid Crystal Lens" (the Japanese Journal of Applied Physics 43, 652-653 (2004)) disclosed a solution to generate a cylindrical lens by using the interval between two electrodes. However, since the liquid crystal lens generated in this solution had a small aperture and a large aberration and could not be switchable between a positive lens state and a negative lens state, and the voltage distribution cannot be accurately controlled, the liquid crystal lenses had a poor performance. "Polarization independent blue-phase liquid crystal cylindrical lens with a resistive film" (Apl.opt.51, 2568-2572 (2012)) disclosed a solution of setting a third electrode in the middle of a porous electrode and covering the electrode with a high resistance film to control the potential distribution and form a cylindrical lens switchable between the positive lens state and the negative lens state. However, due to the instability of the high resistance film and the difficulty in controlling the uniformity of the high resistance film, the potential cannot be controlled stably. Thus, it is difficult for the liquid crystal lens in this way to maintain a good lens effect for a long time. "Cylindrical and Powell Liquid Crystal Lenses with Positive-Negative Optical Power" (IEEE Photonics Technology Letters 32, 1057-1060 (2020)) disclosed an ITO electrode with a linearly-increased width which is connected to a center and an edge of an aperture of a cylindrical lens. Moreover, a voltage on the ITO electrode with linearly increased width is distributed to the entire aperture area through the ITO wire. However, the voltage on the ITO electrode with linearly-increased width seriously affect the phase distribution of the cylindrical lens, and it is difficult to accurately control the width of the ITO electrode, so the effect of the liquid crystal cylindrical lens is not ideal.

SUMMARY OF THE DISCLOSURE

The present disclosure aims to provide a liquid crystal optical device which can solve the technical problem that the existing liquid crystal optical device cannot accurately control the potential distribution of the relevant area of the liquid crystal optical device through a simple controlling method, and the phase distribution of the liquid crystal optical device is not ideal.

The technical solution of the present disclosure is:

In a first aspect, the present disclosure provides a liquid crystal optical device.

In a second aspect, the present disclosure provides a liquid crystal optical device array including a plurality of the liquid crystal optical devices of the first aspect.

In a third aspect, the present disclosure provides a liquid crystal optical device array including the liquid crystal optical device of the first aspect.

In a fourth aspect, the present disclosure provides an electronic product including a control circuit and the liquid crystal optical device of the first aspect or the liquid crystal optical device array of the second aspect or the liquid crystal optical device array of the third aspect.

In a fifth aspect, the present disclosure provides a driving method for driving the liquid crystal optical device of the first aspect or the liquid crystal optical device array of the second aspect or the liquid crystal optical device array of the third aspect.

In the liquid crystal optical device, the liquid crystal optical device array, the electronic product, and the driving method of the present disclosure, the conductive line to which two driving voltages are applied is used to generate the potential varying with the position of the conductive line, and the multiple leading-out lines extend outwards from different positions of the conductive line. Since one end of the leading-out line is connected to the conductive line 61 and the other end of the leading-out line is suspended, thus, the potential at the leading-out position on the conductive line can be extended by the leading-out line to an area to which the leading-out line can be extended. By configuring the condition satisfied by the resistance between each leading-out position on the conductive line and the first position and the distance between at least a part of each leading-out line in the first direction and the first position, the potential distribution generated by the part of the leading-out line can be accurately controlled. Furthermore, the deflections of the liquid crystal molecules in liquid crystal optical devices can be controlled by the generated potential distribution to allow the emergent light transmitting in the liquid crystal layer to generate a phase distribution being closer to the expected phase distribution. Therefore, a liquid crystal optical device having a more improved performance can be obtained by only two driving voltages.

BRIEF DESCRIPTION OF THE DRAWINGS

In order to explain the technical solutions in the embodiments of the present disclosure or the prior art more clearly, the drawings used by the description of the embodiments or the prior art will be briefly introduced below. Obviously, the drawings in the following description may be merely some embodiments of the present disclosure. For those of ordinary skilled in the art, other drawings may be obtained according to the structures shown in the drawings without creative effort.

The purpose realization, functional characteristics and advantages of the present disclosure will be further described with reference to the drawings in combination with the embodiments as described hereinafter.

PREFERRED EMBODIMENTS

In the following, the technical solutions in the embodiments of the present disclosure will be clearly and completely described with reference to the drawings in the embodiments of the present disclosure. Obviously, the described embodiments may be only a part of the embodiments of the present disclosure, but not all of the embodiments. Based on the embodiments of the present disclosure, all other embodiments obtained by those of ordinary skilled in the art without creative effort shall fall within the protection scope of the present disclosure.

It is to be understood that, all of the directional instructions in the exemplary embodiments of the present disclosure (such as top, down, left, right, front, back . . . ) can only be used for explaining relative position relations, moving condition of the elements under a form (referring to FIG. s), and so on, if the form changes, the directional instructions changes accordingly.

In addition, descriptions such as "first" and "second" in the present disclosure may be for descriptive purposes only, and cannot be understood as indicating or implying the relative importance or implicitly indicating the number of indicated technical features. Therefore, the features defined as "first" and "second" may explicitly or implicitly comprise at least one of the features. In addition, the meaning of "and/or" appearing in the context means including three parallel solutions, taking "A and/or B" as an example, "A and/or B" comprises only solution A, or only solution B, or both solutions A and B. In addition, the technical solutions among the various embodiments can be combined with each other, but the combinations must be based on what can be achieved by those of ordinary skill in the art. When a combination of technical solutions is contradictory or cannot be achieved, it should be considered that such a combination of technical solutions does not exist and is not within the protection scope claimed by the present application.

Embodiment 1

Figure 1:
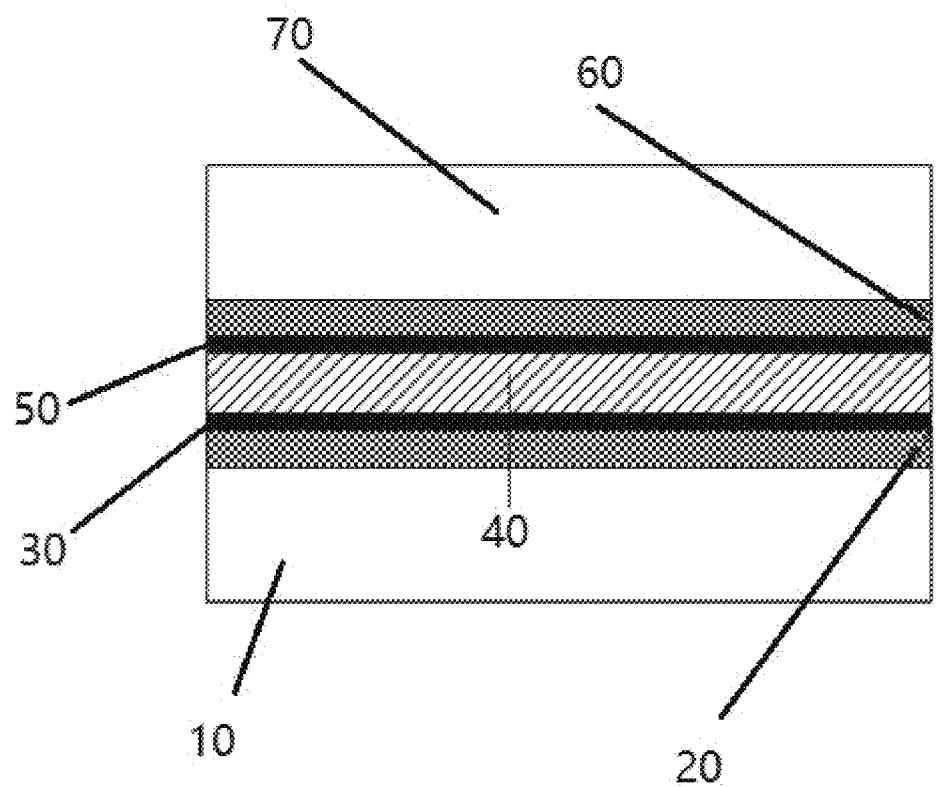
FIG. 1 is a sectional view of a liquid crystal optical device in accordance with an embodiment of the present disclosure.

As shown in FIG. 1, the present embodiment provides a liquid crystal optical device, which includes a liquid crystal layer 40, a first orientation layer 30, a second orientation layer 50, a first electrode layer 20, a second electrode layer 60, a first transparent substrate 10, and a second transparent substrate 70. The first orientation layer 30 and the second orientation layer 50 are respectively located on opposite sides of the liquid crystal layer 40, the first electrode layer 20 is located on one side of the first orientation layer 30 facing away from the liquid crystal layer 40, and the second electrode layer 60 is located on one side of the second orientation layer 50 facing away from the liquid crystal layer 40. The first transparent substrate 10 is located on one side of the first electrode layer 20 facing away from the liquid crystal layer 40, and the second transparent substrate 70 is located on one side of the second electrode layer 60 facing away from the liquid crystal layer 40.

The liquid crystal layer 40, the first orientation layer 30, the second orientation layer 50, the first electrode layer 20, the second electrode layer 60, the first transparent substrate 10 and the second transparent substrate 70 are stackedly arranged along the light transmitting direction of the liquid crystal optical device, that is, a normal direction of each layer. The arrangement can be shown in FIG. 1.

The first electrode layer 20 is a planar electrode, and the first electrode layer 20 can form a plane with equal potential.

Figure 2:
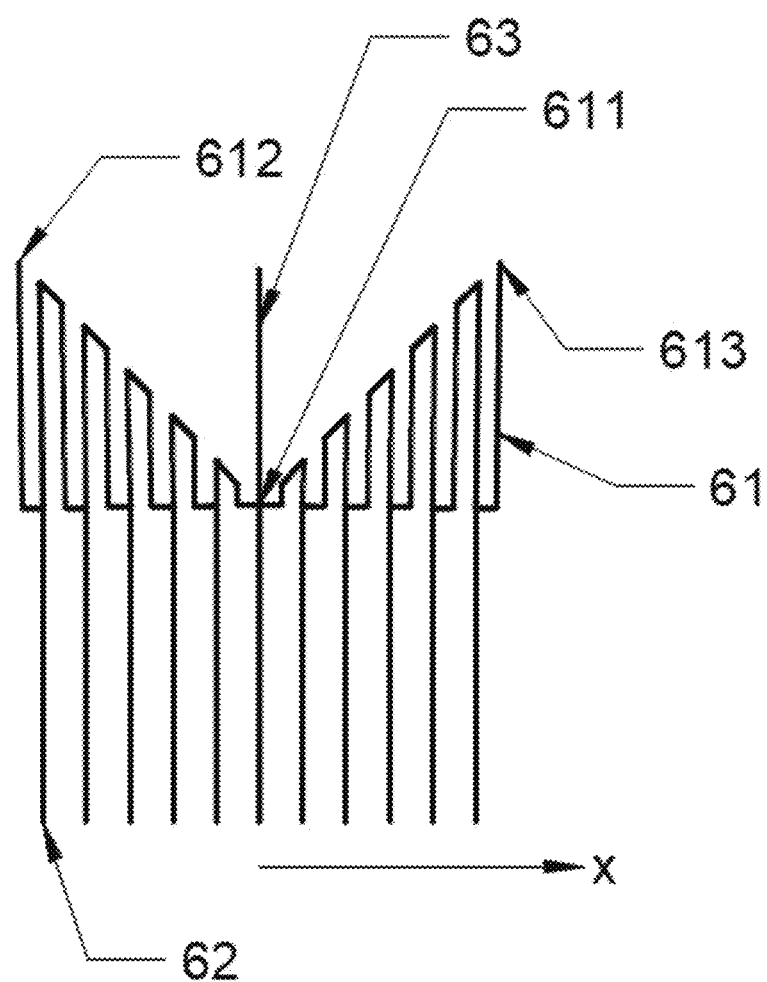
FIG. 2 is a schematic view of a second electrode layer in the liquid crystal optical device in accordance with an embodiment of the present disclosure.
Figure 4:
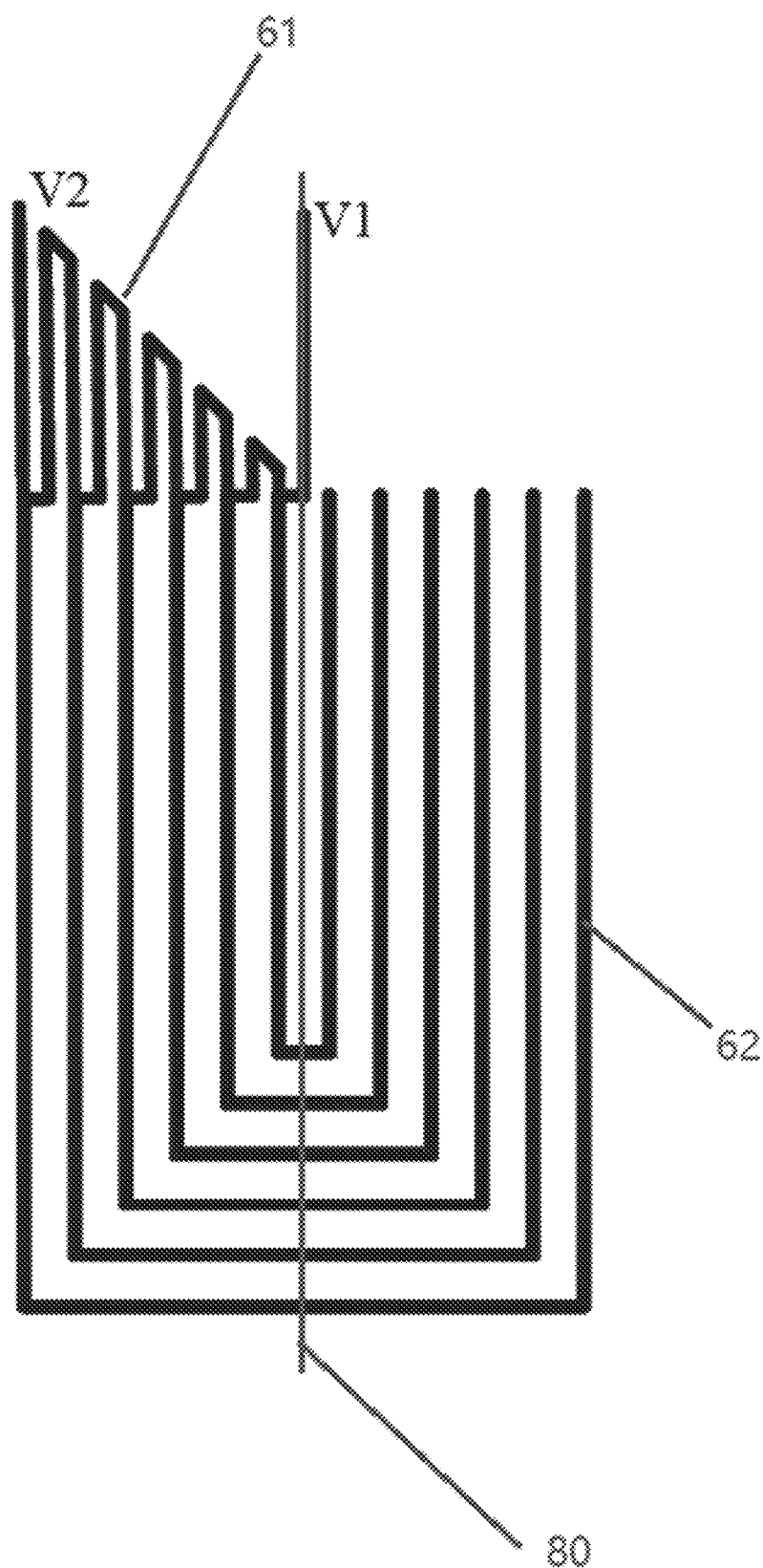
FIG. 4 is a schematic view of a second electrode layer using a half conductive line in accordance with an embodiment of the present disclosure.

As shown in FIG. 2 and FIG. 4, the second electrode layer 60 includes a conductive line 61 and a plurality of leading-outs 62. The conductive line 61 includes a first position 611 and a second position 612 different from the first position 611. The first position 611 is configured to receive a first driving voltage, and the second position 612 is configured to receive a second driving voltage. One end of the leading-out line 62 is connected with the conductive line 61, and the opposite end is suspended. A position of the conductive line 61 at which the conductive line 61 is connected to each leading-out line 62 is a leading-out position. At least a part of the leading-out position is located between the first position 611 and the second position 612 of the conductive line 61. A resistance between each leading-out position on the conductive line 61 and the first position 611 and a distance between at least a part of each leading-out line 62 and the first position 611 in a first direction satisfy a first condition.

The number of the leading-out lines 62 can be greater than or equal to 2. The leading-out positions of each leading-out line 62 can be the same as each other or different from each other. All the leading-out lines 62 or at least a part of the leading-out lines 62 may be made of transparent material. The conductive line 61 in this embodiment may be a wire with a certain resistance or a thin electrically-conductive line coated on the second substrate with a certain resistance. The conductive line 61 can be made of transparent conductive material.

The first driving voltage and the second driving voltage can be respectively applied at two different positions on the conductive line 61, namely the first position 611 and the second position 612. When the two driving voltages are applied to the conductive line 61, different potentials are distributed at different positions on the conductive line 61. Since one end of the leading-out line 62 in this embodiment is connected to the conductive line 61 and the other end of the leading-out line 62 is suspended, thus, the potential at each position of the same leading-out line 62 is equal to each other, and the potential is equal to the potential of the conductive line 61 at the position where the leading-out line 62 is connected to the conductive line 61. In this way, the desired potential of each leading-out line 62 can be obtained by configuring the leading-out positions of each leading-out line 62. Each leading-out line 62 can be extended to some needed positions to control the potential distribution at these needed positions through the potential on the leading-out line 62. For example, each leading-out line 62 can be extended to an area where an electric field generated by the leading-out line can drive liquid crystal molecules in liquid crystal optical devices to deflect. Since only a part of the leading-out lines 62 may be used to control the potential distribution in practical applications, only the positions of these leading-out lines can be arranged. In other embodiments, the positions of all leading-out lines 62 can be arranged according to actual requirements, which is not limited herein. In order to obtain the desired potential distribution using the leading-out line 62, the resistance between each leading-out position on the conductive line 61 and the first position 611 and the distance between at least a part of each leading-out line 62 in the first direction and the first position 611 satisfy the first condition. When the first driving voltage and the second driving voltage are applied to the conductive line 61, the potential at each position on the conductive line 61 is determined by the resistance between the corresponding leading-out position on the conductive line 61 and the first position 611. Therefore, the spatial potential distribution can be controlled by setting the first condition which the distance between a certain part of each leading-out line 62 or all parts of each leading-out line 62 and the first position 611 and the resistance between the corresponding leading-out position on the conductive line 61 and the first position 611 satisfy. The first direction mentioned above can be set according to actual needs. When the potential distribution at each position in a certain direction in the space where the liquid crystal optical device is located is required to be controlled, the certain direction can be set as the first direction. In this embodiment, different spatial potential distributions can be obtained by setting different first conditions, so as to obtain liquid crystal optical devices with different effects. When using the liquid crystal optical device having a structure in this embodiment, the potential on each leading-out line 62 and the position where each leading-out line 62 passes by can be accurately controlled, so that the potential distribution in the space where the liquid crystal optical device is located can be accurately controlled, so as to obtain the liquid crystal optical device with better performance. In addition, in this embodiment, only the first driving voltage and the second driving voltage are required to realize the accurate control of the potential at each position in the space where the liquid crystal optical device is located. Therefore, the liquid crystal optical device in this embodiment can have a better performance through a simple driving mode.

As shown in FIG. 2, in an embodiment, the conductive line 61 further includes a third position 613. The first position 611 is located between the third position 613 and the second position 612. The third position 613 of the conductive line 61 is configured to receive the second driving voltage. At least a part of the leading-out positions are located between the second position 612 and the third position 613.

In this embodiment, with the third position 613 to which the second driving voltage is applied, the second driving voltage can be simultaneously applied to the second position 612 and the third position 613 of the conductive line 61. When the second driving voltage is applied to the second position 612 and the third position 613 of the conductive line 61, the potential varying with the position can be generated between the second position 612 and the first position 611 and between the third position 613 and the first position 611. The leading-out lines 62 can extend outward from both sides of the first position 611, respectively. That is, the leading-out position can be located between the second position 612 and the first position 611, or between the third position 613 and the first position 611. With the aforementioned structure, the leading-out line 62 from both sides of the first position 611 can be used to control the potential distribution on both sides of the first position 611, and a bilaterally-symmetrical potential distribution can be formed.

Figure 3:
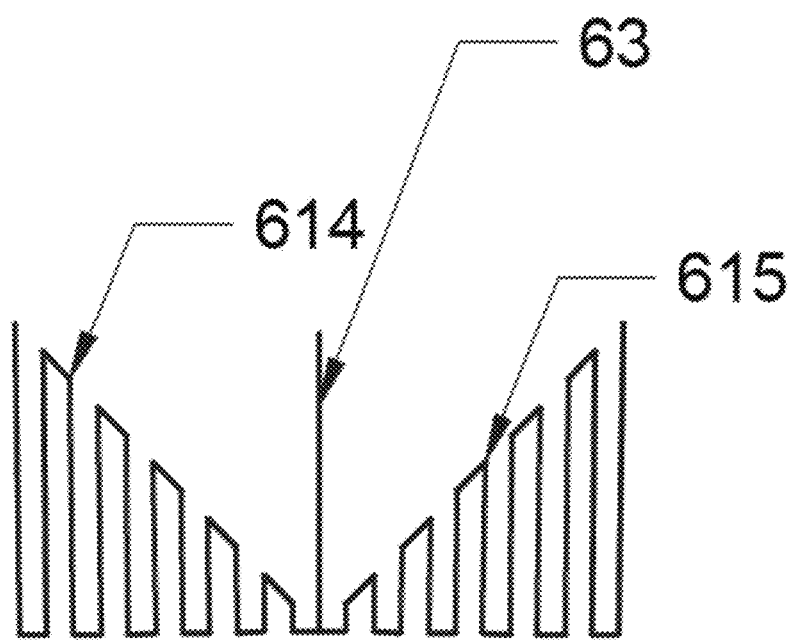
FIG. 3 is a schematic view of a conductive line in the liquid crystal optical device in accordance with an embodiment of the present disclosure.

In an embodiment shown in FIG. 3, the liquid crystal optical device further includes a first electrical connector 63 connected with the conductive line 61 at the first position 611. In this embodiment, the first driving voltage is applied to the first position 611 of the conductive line through the first electrical connector 611.

The conductive line 61 includes a first subpart 614 located between the first position 611 and the second position 612 and a second subpart 615 located between the first position 611 and the third position 613. The first subpart 614 and the second subpart 615 are respectively located on opposite sides of the first electrical connector 63. In order to facilitate the first electrical connector 63 to extend outward from the first position 611 of the conductive line 61, the two parts of the conductive line 61, namely the first subpart 614 and the second subpart 615, are located on both sides of the first electrical connector 63 respectively in this embodiment, which can not only generate potentials varying with positions on both sides of the first position 611, but also avoid the first electrical connector 63 to facilitate the applying of the first driving voltage.

The conductive line 61 of the second electrode layer 60 can adopt the structure shown in FIG. 3 or any of the structures in FIG. 9 to FIG. 13 or other structures. On the basis that the first condition can be satisfied, the structure of the conductive line 61 is not limited herein.

In the embodiment shown in FIG. 4, in this embodiment, the leading-out line 62 includes a first part and a second part respectively located on opposite sides of a reference plane 80, and the conductive line 61 is on the same side of the reference plane 80 as the first part or the second part. The reference plane 80 is perpendicular to the first direction and passes through the first position 611.

As shown in FIG. 4, the space in which the liquid crystal optical device is located is divided into two areas by the reference plane 80. The conductive line 61 is located in only one area, while the leading-out line 62 is extended into both areas. In this embodiment, with the aforementioned structure, the leading-out line 62 can extend outward from only one area to control the potential distributions in both areas. In this way, the driving voltage only needs to be applied at two positions to control the potential distribution on both sides of the first position 611, and a length of the conductive line 61 can be reduced by half, so that the production cost and energy consumption of the liquid crystal optical device can be significantly reduced.

It is also possible to replace a half of the conductive line 61 of any form shown from FIG. 9 to FIG. 13 with the part of the conductive line 61 shown in FIG. 4 to obtain the second electrode layer 60 having the corresponding structure.

In addition, bilaterally-symmetrical potential distribution can be formed. In this embodiment, an extended line may include only the first part and the second part or may include other parts beside the first part and the second part, which is not limited herein.

Figure 5:
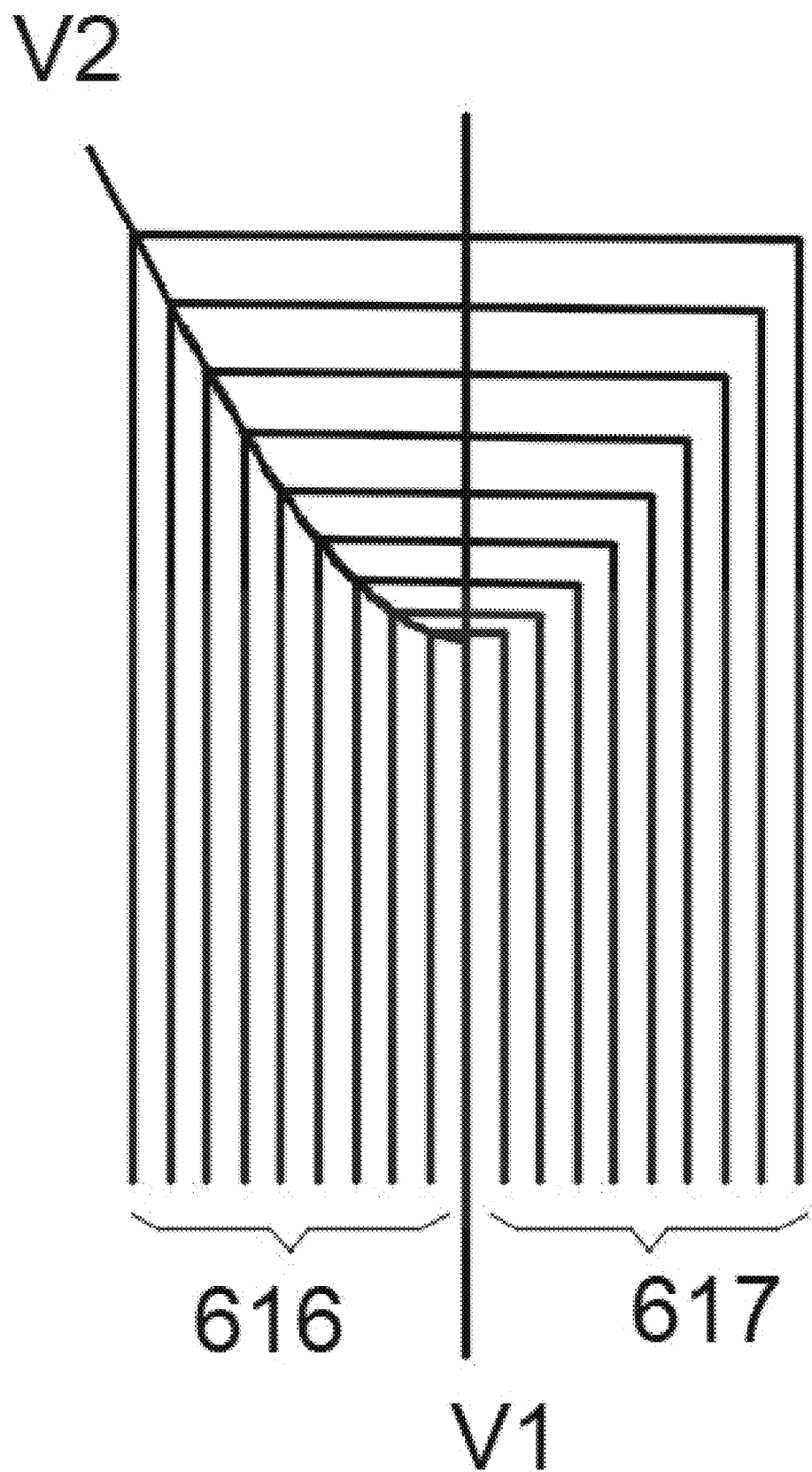
FIG. 5 is a schematic view of a second electrode layer in using a half conductive line in accordance with another embodiment of the present disclosure.

As shown in FIG. 5, in this embodiment, the leading-out line 62 includes a first group of leading-out lines 616 and a second group of leading-out lines 617. The first group of leading-out lines 616 extends outward from the conductive line 61 to the first area 81, and the second group of leading-out lines 617 extends outwards from the conductive line 61 to the second area 82. The first area 81 and the second area 82 are distributed on opposite sides of the reference plane 80. The reference plane 80 passes through the first position 611 and is perpendicular to the first direction. The conductive line 61 is located in the first area 81 or the second area 82. In this embodiment, the leading-out lines 62 are divided into two groups, both of which extend outward from the conductive lines 61 which is located only in the first area 81 and then extend into the first area 81 and the second area 82 respectively. In this way, the potential distribution on both sides of the first position 611 can be controlled by applying the driving voltage at only two positions, and the length of the conductive line 61 can be reduced by half, which significantly reduces the production cost and energy consumption of liquid crystal optical devices.

In order to improve the processing efficiency and reduce the production cost, a width of the conductive line 61 at each position remains unchanged. When the driving voltage is applied at two positions on the conductive line 61, the width of the part of the conductive line 61 between the second position 612 and the third position 613 can remain unchanged. When the driving voltage is applied at three positions on the conductive line 61, the width of the part of the conductive line 61 between the second position 612 and the third position 613 can remain unchanged.

If the width of the conductive line 61 at each position remain unchanged, the length between each leading-out position and the first position 611 on the conductive line 61 and the distance between at least a part of each leading-out line 62 in the first direction and the first position 611 can satisfy a second condition.

When the width of the conductive line 61 at each position remains unchanged, the resistance between each leading-out position on the conductive line 61 and the first position 611 on the conductive line 61 is proportional to the length between each leading-out position and the first position 611 on the conductive line 61. Thus, the potential on the leading-out line 62 can be controlled by controlling the length between each leading-out position and the first position 611 on the conductive line 61.

The present embodiment further provides a liquid crystal optical device having a structure which can form a parabolic potential distribution. Correspondingly, the resistance between each leading-out position on the conductor line 61 and the first position 611 is in parabolic correlation with the distance between at least a portion of each leading-out line 62 in the first direction and the first position 611.

The resistance between each leading-out position on the conductive line 61 and the first position 611 is in parabolic correlation with the distance between at least a part of each leading-out line 62 in the first direction and the first position 611. It means that, in a rectangular coordinate system established with the resistance between the leading-out position and the first position 611 and the distance between at least a part of each leading-out line 62 in the first direction and the first position 611 as axes of the rectangular coordinate system, a curve representing the corresponding relationship between the resistance between each leading-out position on the conductive line 61 and the first position 611 and the distance between at least a part of each leading-out line 62 in the first direction and the first position 611 is a parabola.

Figure 7:
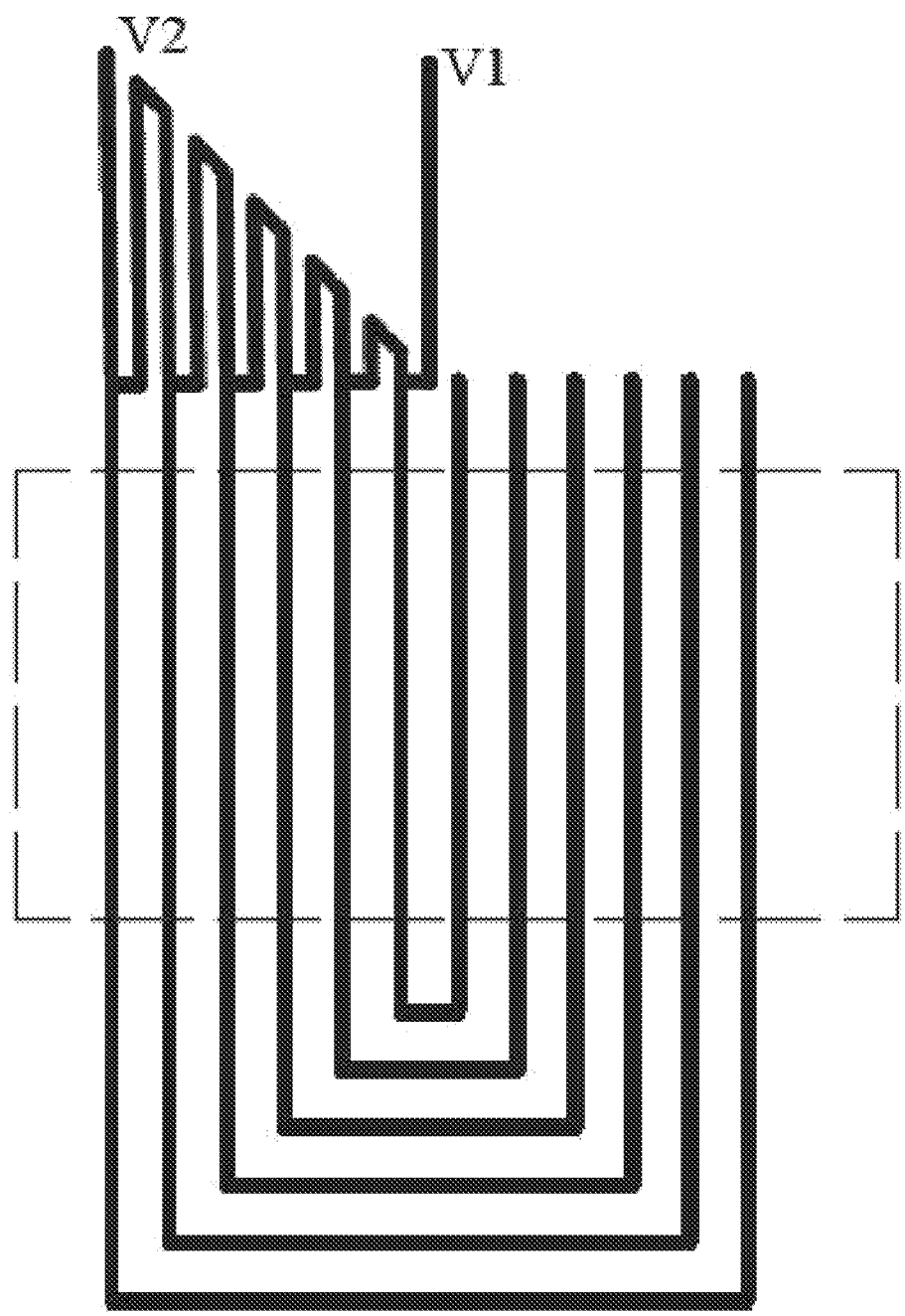
FIG. 7 is a schematic view of the part of the leading-out line satisfying a first condition in accordance with an embodiment of the present disclosure.
Figure 8:
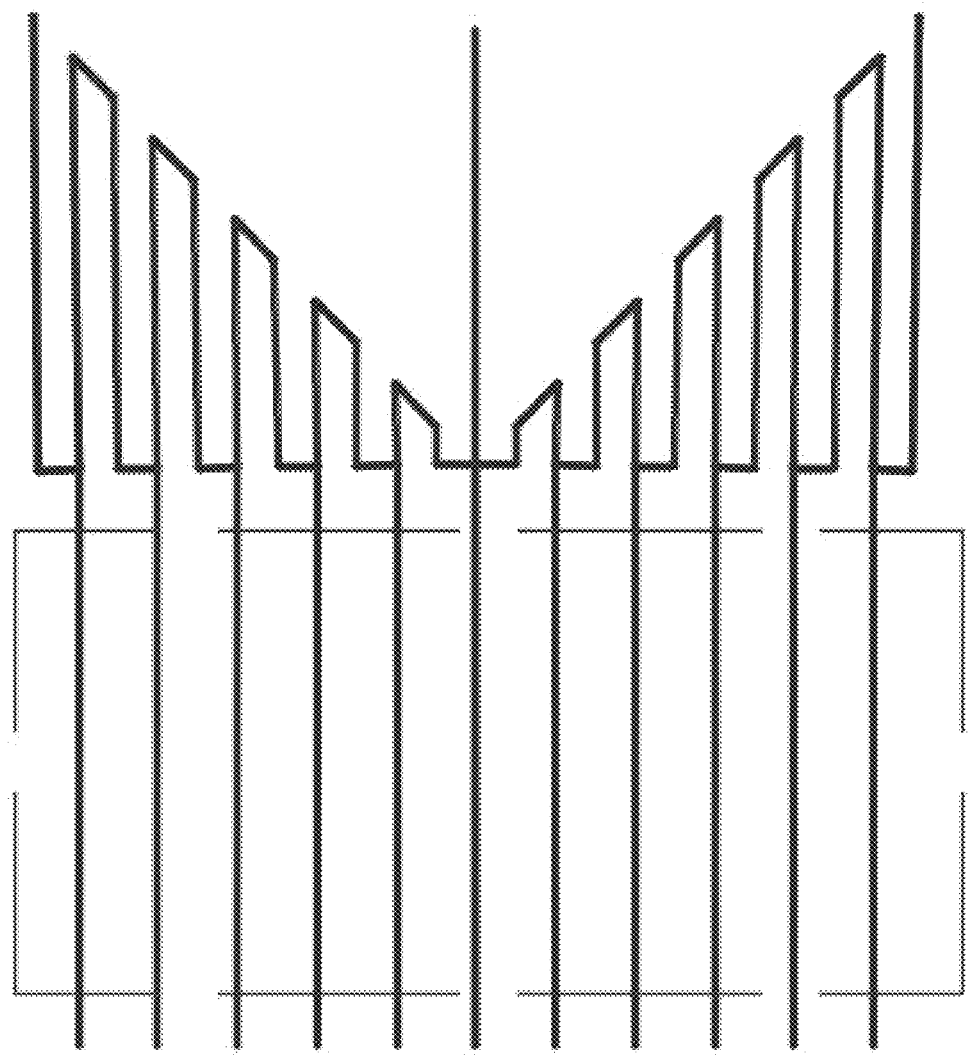
FIG. 8 is a schematic view of one structure in which leading-out lines are parallel to each other in a certain area in accordance with an embodiment of the present disclosure.
Figure 9:
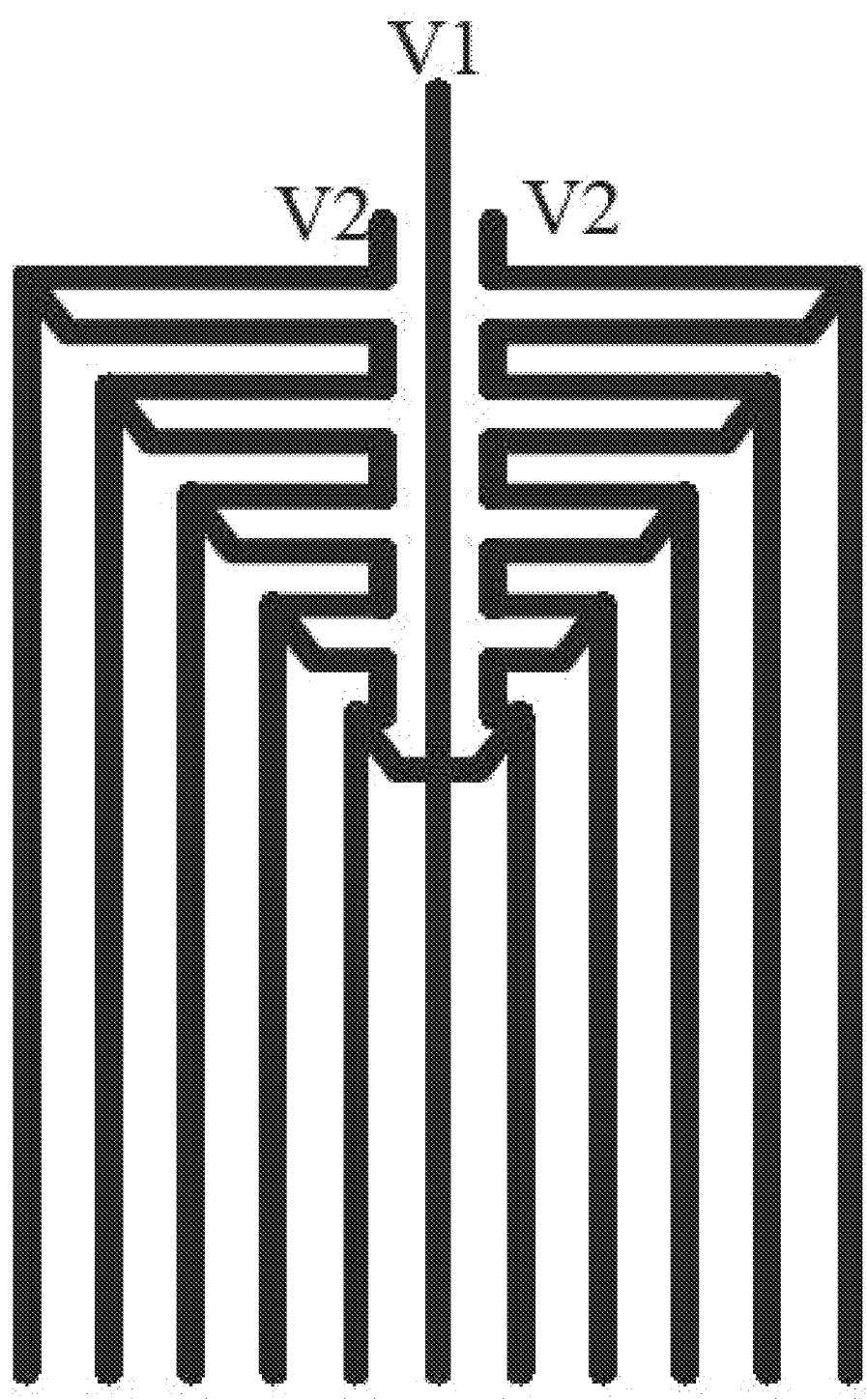
FIG. 9 is a schematic view of a second electrode layer in accordance with a fourth embodiment.
Figure 10:
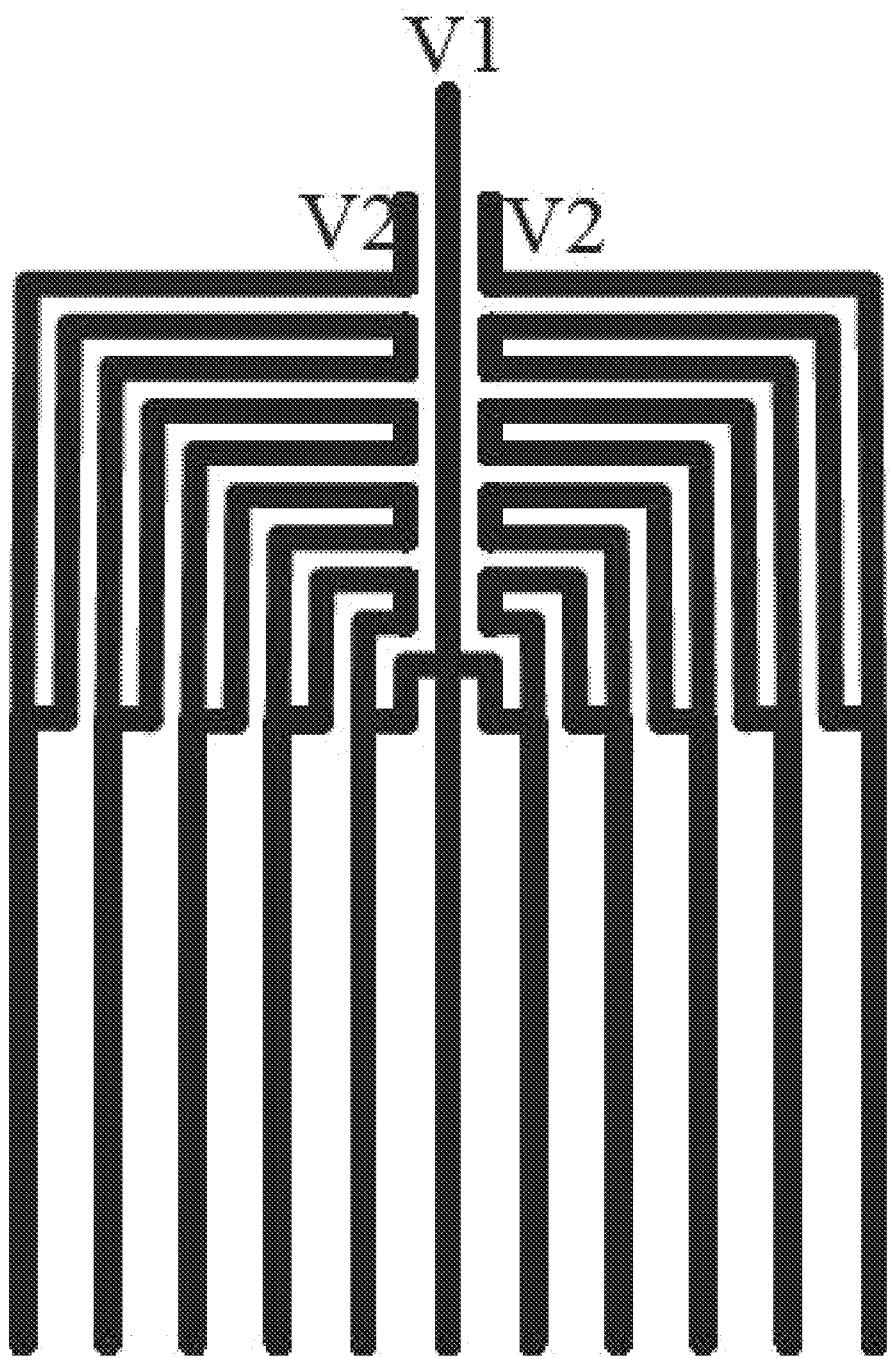
FIG. 10 is a schematic view of a second electrode layer in accordance with a fifth embodiment.
Figure 11:
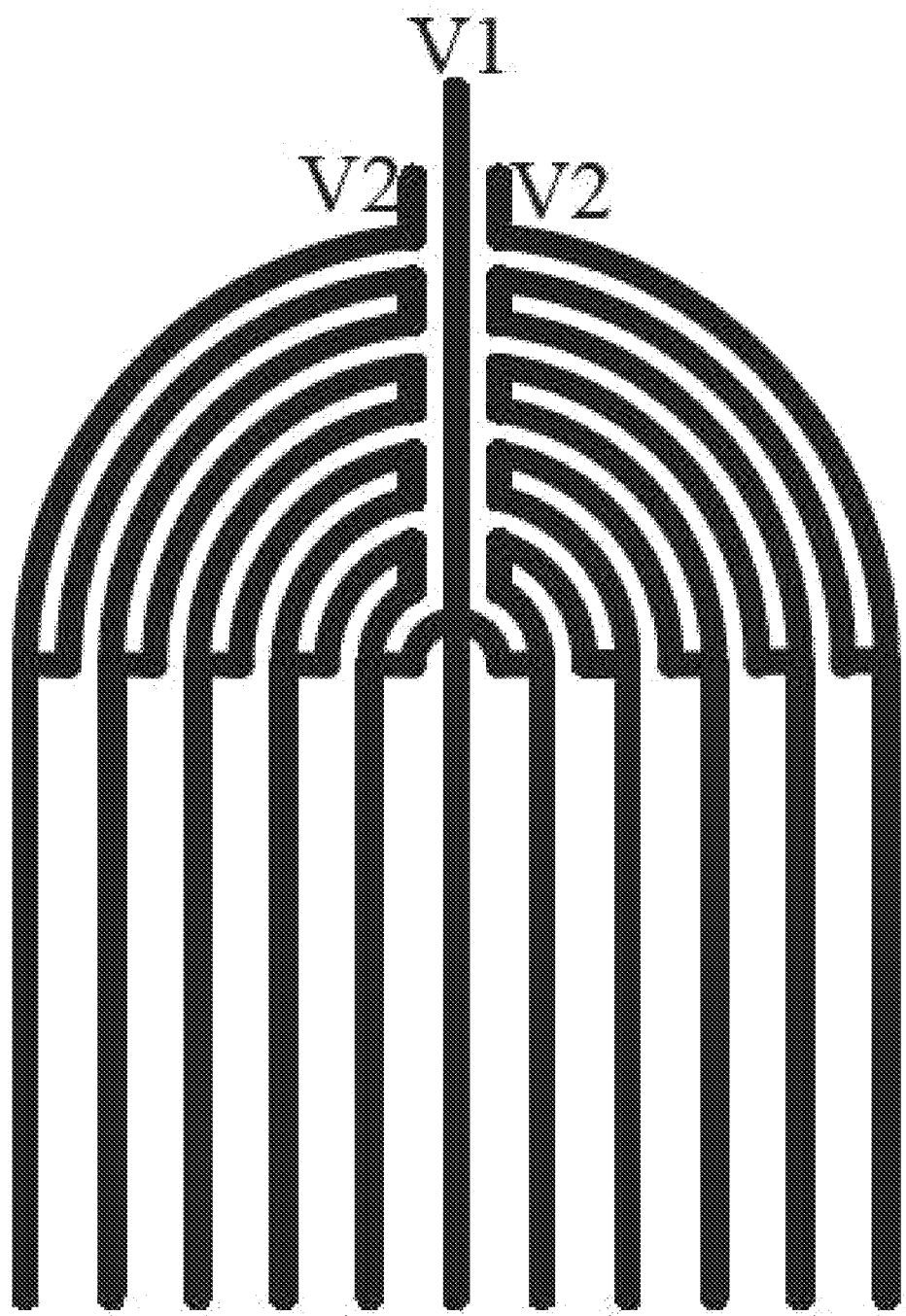
FIG. 11 is a schematic view of a second electrode layer in accordance with a sixth embodiment.
Figure 12:
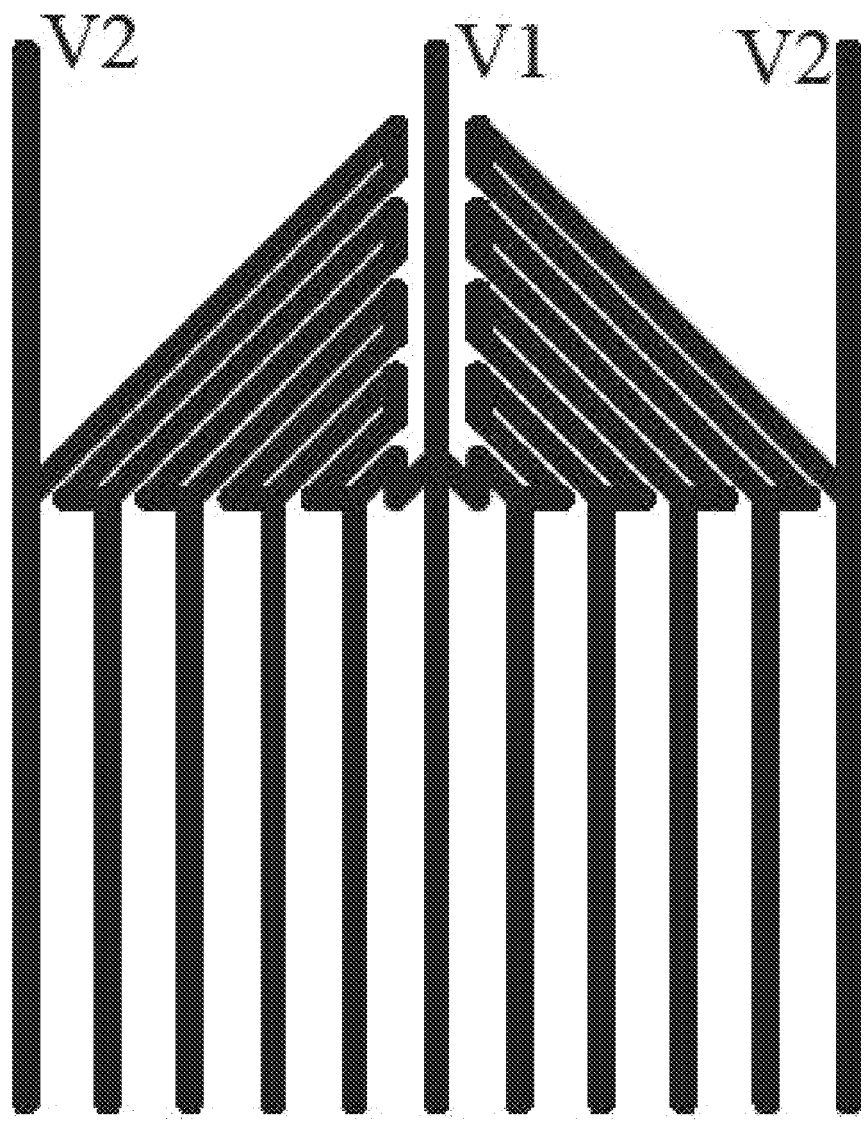
FIG. 12 is a schematic view of a second electrode layer in accordance with a seventh embodiment.
Figure 13:
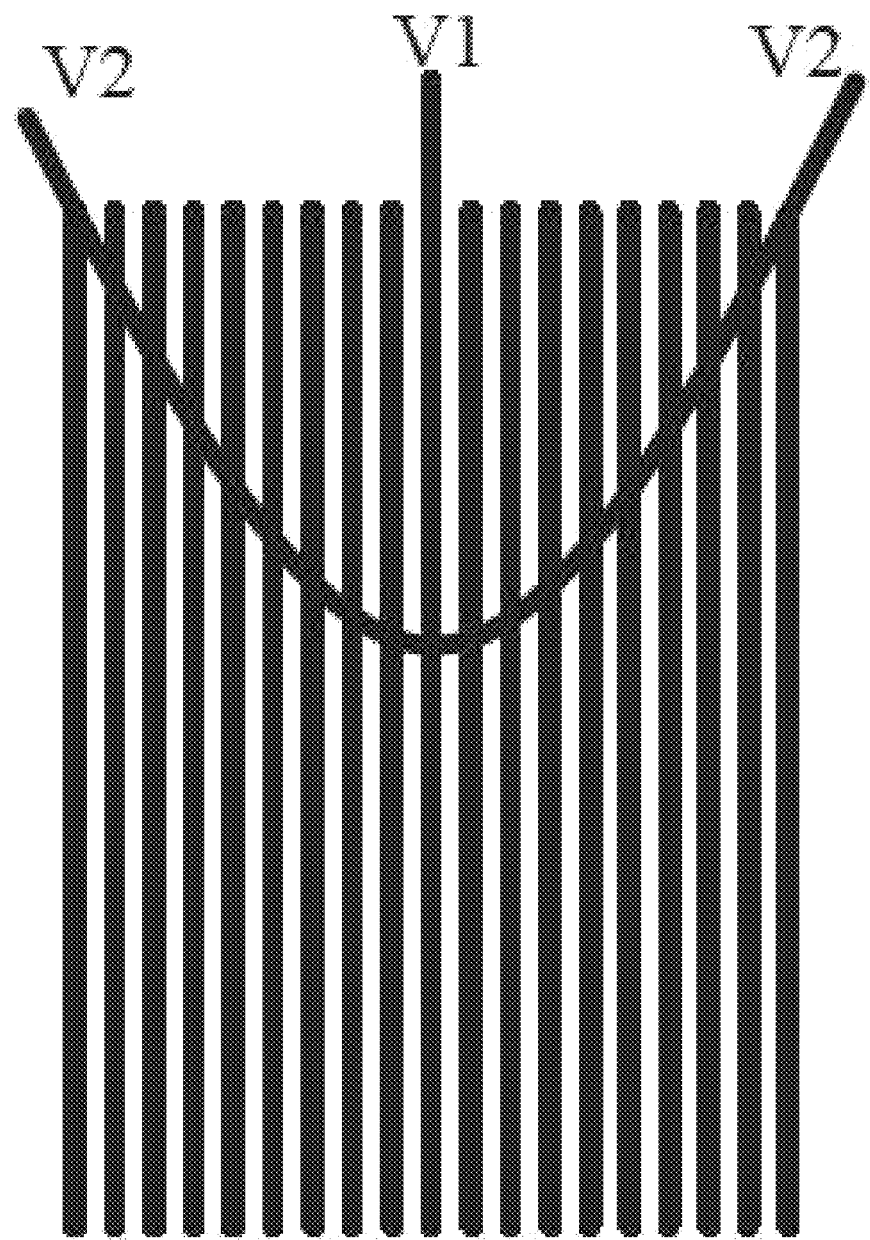
FIG. 13 is a schematic view of a second electrode layer in accordance with an eighth embodiment.

As shown in FIG. 7 and FIG. 8, for the convenience of illustration, the part of each leading-out line 62 which is required to satisfy the first condition is selected by dotted wireframe. Understandably, the whole conductive line 62 or any part of the conductive line 62 can be selected as the part satisfying the first condition according to practical needs, rather than limited to the part represented by the dashed box.

Figure 6:
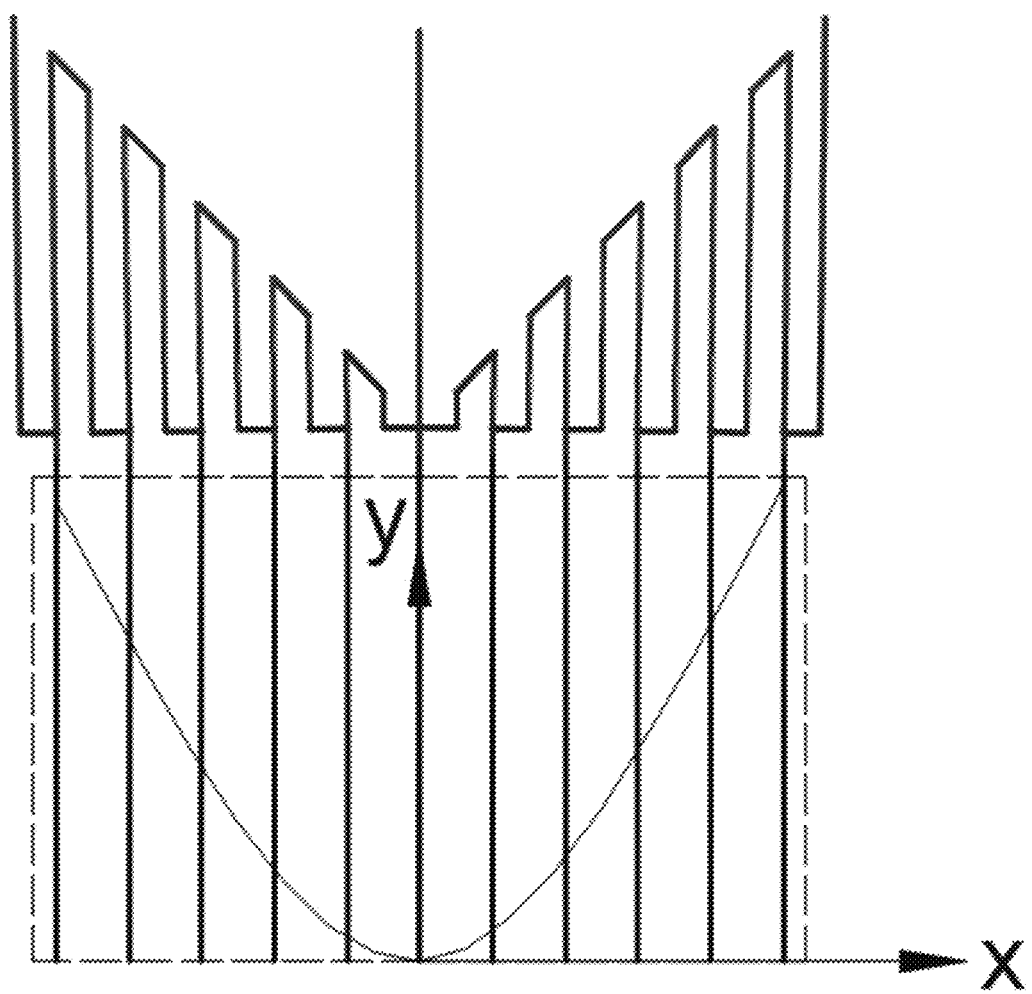
FIG. 6 is a schematic view showing potential distribution of each leading-out line in accordance with an embodiment of the present disclosure.

As shown in FIG. 6, a rectangular coordinate system is established with the first position 611 as the coordinate origin, the first direction as the X-axis, and the magnitude of the potential as the Y-axis. The coordinate of X-axis represents the distance between at least a part of each leading-out line 62 in the first direction and the first position 611. When the first driving voltage and the second driving voltage are applied, the resistance between each leading-out position and the first position 611 is proportional to the potential of the leading-out position. Therefore, when the first condition is that the resistance between each leading-out position on the conductive line 61 and the first position 611 is in parabolic correlation with the distance between at least a part of each leading-out line 62 in the first direction and the first position 611, the potential formed by the leading-out line 62 in the dashed box is in parabolic distribution.

In the case that the width of the conductive line 61 remains unchanged, the second condition is that the length between each leading-out position and the first position 611 is in parabolic correlation with the distance between at least a part of each leading-out line 62 in the first direction and the first position 611. In the case that the width of the conductive line 61 remains unchanged, the resistance between each leading-out position on the conductive line 61 and the first position 611 is proportional to the length between each leading-out position and the first position 611 on the conductive line 61. Thus, the potential formed by at least a part of the leading-out line 62 in the first direction can be in parabolic distribution if the length between each leading-out position 61 and the first position 611 is in parabolic correlation with the distance between at least a part of each leading-out line 62 in the first direction and the first position 611.

As shown from FIG. 8 to FIG. 12, in one embodiment, the conductive line 61 in this embodiment is bent for many times to form multiple segments. The leading-out position is located at the bending portions between two adjacent segments, and projections of the leading-out positions in the first direction stagger each other. Widths of the segments are the same as each other, and each segment increases linearly from the first position 611 to the second position 612. Or the widths of the segments are the same each other, each segment located between the first position 611 and the second position 612 increases linearly from the first position 611 to the second position 612, and each segment located between the first position 611 and the third position 613 increases linearly from the first position 611 to the third position 613. The potential in parabolic distribution can also be obtained by using the above method.

In practical applications, it is often necessary to achieve the effect of a liquid crystal cylindrical lens. Therefore, in an embodiment, the leading-out lines 62 are parallel to each other in at least one area (for example, the area represented by the dashed line boxes in FIGS. 7 and 8), and the part of each leading-out line 62 satisfying the first condition is at least partially located in the area. Since the potential at each position of each leading-out line 62 is the same as each other and satisfies the first condition, the potential in cylinder distribution can be formed in the areas in which the leading-out line is parallel to each.

In the area where the leading-out lines 62 is parallel to each other, when the resistance between each leading-out position on the conductive line 61 and the first position 611 is in parabolic correlation with the distance between each leading-out line 62 and the first position 611 in the first direction, the potential in parabolic cylinder distribution can be formed by the leading-out line 62 in the above area.

When the width of the conductive line 61 remains unchanged, the leading-out lines 62 are parallel to each other in at least one area, and the part of each leading-out line 62 satisfying the second condition is at least partially located in the area.

In the area where the leading-out lines 62 are parallel to each other, when the width of the conductive line 61 remains unchanged and the length between the leading-out lines 61 and the first position 611 on the conductive line 61 is in parabolic correlation with the distance between the leading-out lines 62 and the first position 611 in the first direction, the potential in parabolic cylinder distribution can be formed by the leading-out line 62 in the above area.

Figure 14:
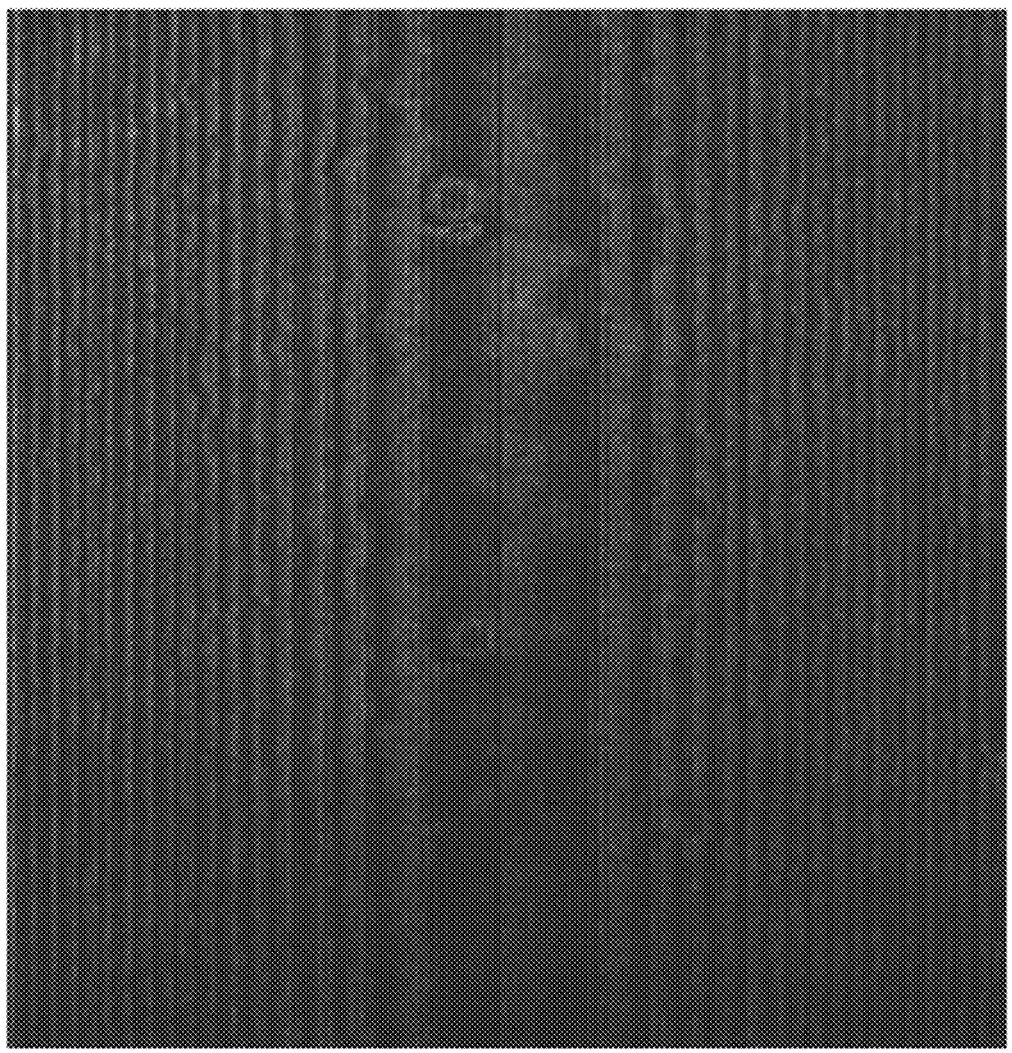
FIG. 14 is a schematic view showing an interference pattern of a liquid crystal cylindrical lens in accordance with an embodiment of the present disclosure.
Figure 19:
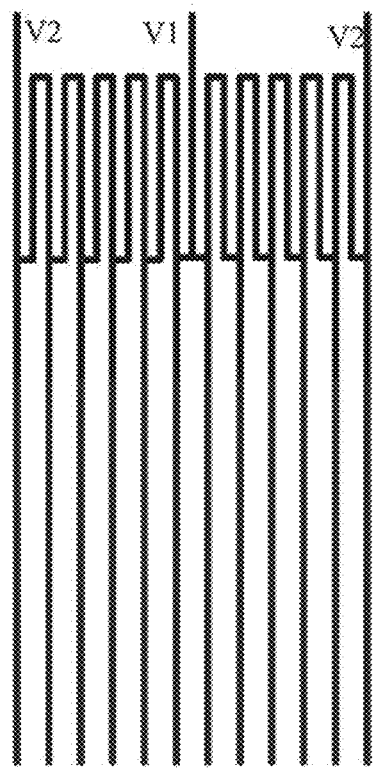
FIG. 19 is a schematic view of a second electrode layer of the liquid crystal conical lens in accordance with an embodiment of the present disclosure.

According to the position of the liquid crystal layer 40 in the liquid crystal optical device, the areas where the leading-out lines 62 are parallel to each can be set in this embodiment, so that the specific form of electric field generated by the leading-out lines 62 in these areas can drive the liquid crystal molecules to deflect. For example, after a potential in parabolic cylinder distribution is generated by the leading-out lines 62 in the above area, the electric field generated by the potential can drive the liquid crystal molecules in the liquid crystal layer 40 to deflect and form the liquid crystal cylindrical lens. Because the above structure can generate a potential in accurate parabolic cylinder distribution, a liquid crystal cylindrical lens having a good performance can be obtained in this embodiment. An interference pattern obtained by using the liquid crystal lens in this embodiment is shown in FIG. 14. It can be seen from FIG. 14 that the liquid crystal lens in this application can achieve a good columnar lens effect. As shown in FIG. 19, in an embodiment, the resistance between each leading-out position on the conductive line and the first position in this embodiment is proportional to the distance between at least a part of each leading-out line in the first direction and the first position. A conical lens can be formed by using the above structure.

Figure 20:
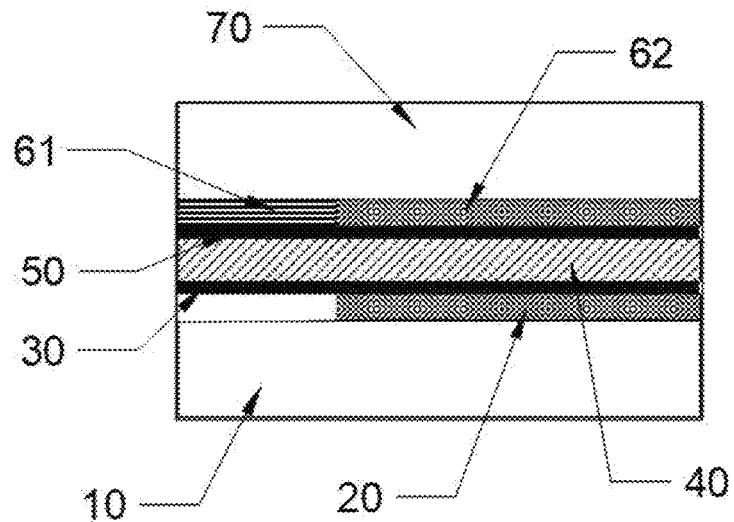
FIG. 20 is a schematic view of the structure in which a planar electrode corresponding to the conductive line is omitted in accordance with an embodiment of the present disclosure.

As shown in FIG. 20, in an embodiment, the projection of the conductive line 61 on a plane parallel to the second electrode layer and the projection of the planar electrode on the same plane are not overlapped in this embodiment. In this embodiment, the part of the second electrode layer rightly corresponding to the planar electrode is omitted, so that the conductive line may not be affected by the capacitance effect between the conductive line and the planar electrode, which further improves the performance of the liquid crystal optical device.

In an embodiment, the conductive line is located outside a functional area of the liquid crystal optical device. The functional area of liquid crystal optical device refers to the area in which light can be modulated according to the need. In the prior art, the component for generating potential distribution must be placed in the functional area of the liquid crystal optical device. Since the component for generating potential distribution is limited by the range of functional areas, it is difficult to meet the demand of controlling potential. In this embodiment, the component for generating potential, namely the conductive line in this embodiment, is separated from the component for controlling potential distribution, namely the leading-out line in this embodiment, and the component for generating potential is located outside the functional area, and at least a part of the component for controlling the potential distribution is located in the functional area of the liquid crystal optical device. In this way, the component for generating potential distribution can be prevented from being limited by the functional area, so that accurate design can be achieved conveniently, and the components for generating potential distribution and the functional area can not affect each other.

In addition, a high resistance film or high dielectric constant layer can also be provided in this embodiment, wherein the high resistance film or high dielectric constant layer can be arranged between the second electrode layer and the second orientation layer, or between the second electrode layer and the second transparent substrate. The high resistance film or high dielectric constant layer can smooth the potential between adjacent leading-out lines.

Embodiment 2

In the application of naked eye 3D technology, a columnar lens array is a key component. Currently, the naked eye 3D technology is applied in more and more electronic digital products However, in the prior art, the columnar lens array has the following problems, for example, the focus cannot be adjusted, or the columnar lens array cannot switch between a working state and a non-working state, which greatly limits the applications of the digital products. In an embodiment, the present disclosure provides a liquid crystal optical device array includes a plurality of liquid crystal optical devices 100 described in Embodiment 1 arranged in an array. The first condition satisfied by each liquid crystal optical device 100 in the array can be the same as each other or different from each other, which is not limited herein. When the first condition satisfied by each liquid crystal optical device 100 in the array is the same as each other, the effect of each liquid crystal optical device 100 in the array is the same. When the first conditions satisfied by all liquid crystal optical devices 100 in the array are not the same as each other, the effects of all the liquid crystal optical devices 100 in the array are also not identical.

Figure 15:
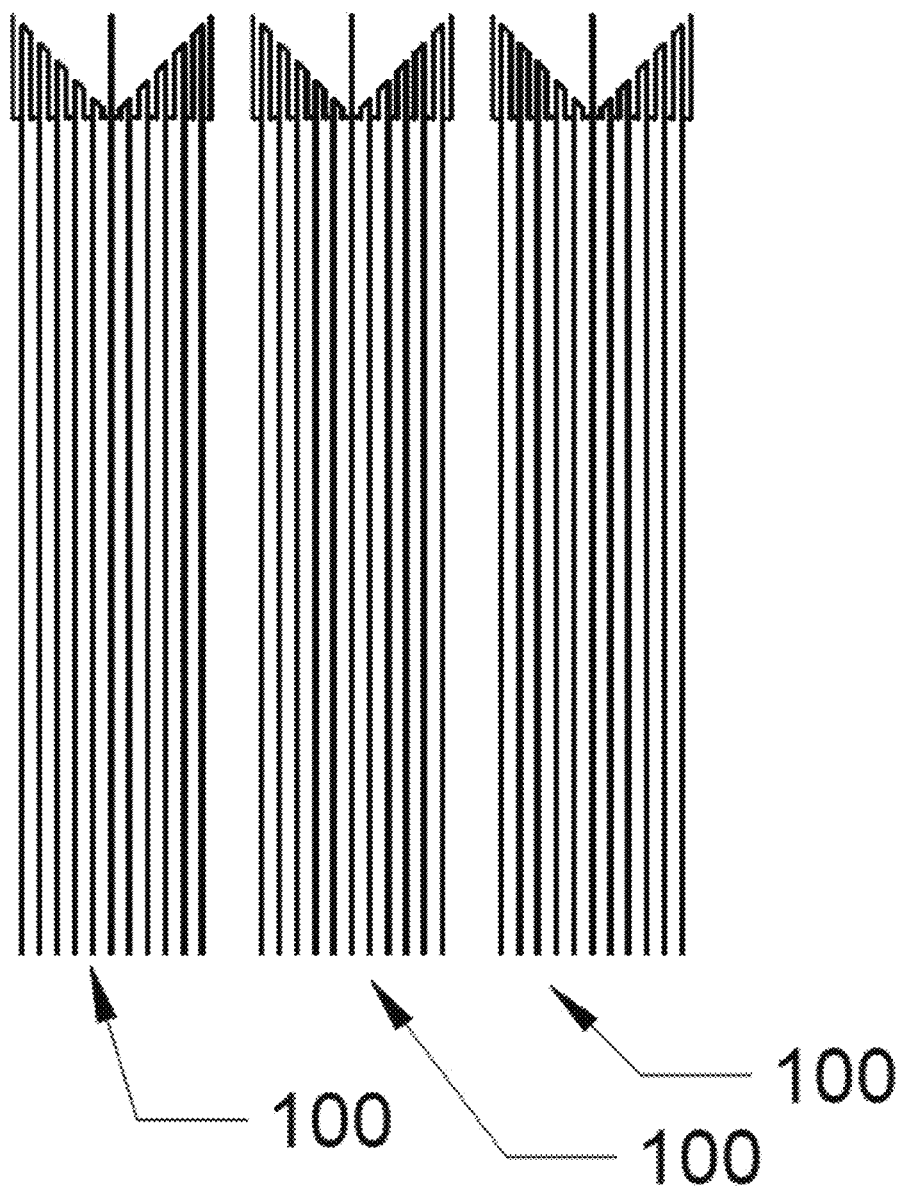
FIG. 15 is a schematic view of a liquid crystal optical device array in Embodiment 2 of the present disclosure.

As shown in FIG. 15, in an embodiment, the first condition is that the resistance between each leading-out position on the conductive line 61 and the first position 611 is in parabolic distribution with the distance between at least a part of each leading-out line 62 in the first direction and the first position 611, and each leading-out line 62 of the liquid crystal optical device 100 is parallel to each other in at least one area. That is, the liquid crystal optical devices 100 in the array in this embodiment are all cylindrical lenses, thereby forming the liquid crystal cylindrical lens array. Provided that the above conditions are satisfied, the liquid crystal optical device 100 in Embodiment 1 having different structures can be used to form the liquid crystal columnar lens array in this embodiment.

In an embodiment, in the case that the width of the conductive line 61 remains unchanged, the second condition is that the length between each leading-out position and the first position 611 on the conductive line 61 is in parabolic distribution with the distance between at least a part of each leading-out line 62 in the first direction and the first position 611, and each leading-out line 62 of the liquid crystal optical device 100 is parallel to each other in at least one area, that is, the liquid crystal optical devices 100 in the array in this embodiment are all cylindrical lenses, thereby forming the liquid crystal cylindrical lens array. Provided that the above conditions are satisfied, the liquid crystal optical device 100 of Embodiment 1 having different structures can be used to form the liquid crystal columnar lens array in this embodiment.

By using the structure mentioned above, each liquid crystal lens can form the accurate parabolic cylinder distribution to obtain a better liquid crystal cylindrical lens.

In this embodiment, the first driving voltage and the second driving voltage of each liquid crystal lens are the same as each other, thus, an optical power of each liquid crystal lens and the switching between a positive lens and a negative lens can be controlled by controlling the two driving voltages. For specific controlling methods, see Embodiment 4. When the above cylindrical lens array is used, the optical power of each liquid crystal lens and the switching between the positive lens and negative lens can also be controlled by controlling the first driving voltage and the second driving voltage.

Figure 17:
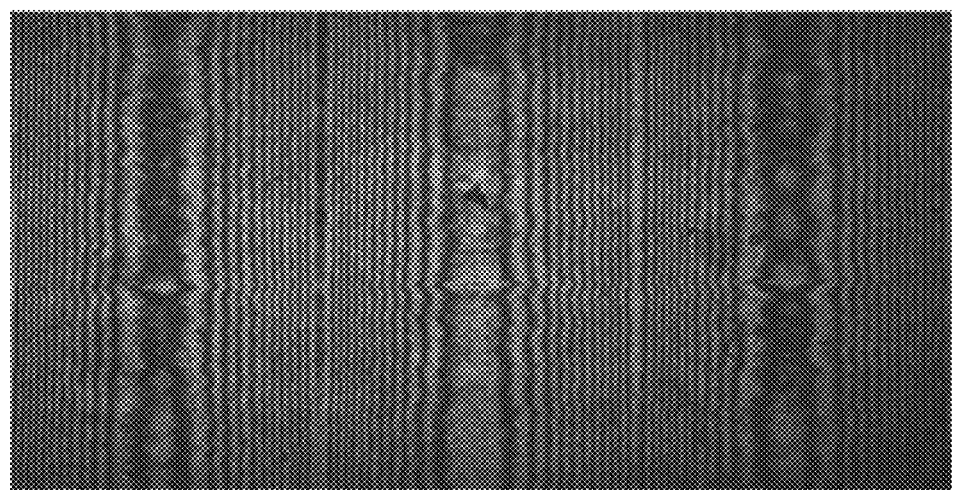
FIG. 17 is a schematic view showing the interference pattern of a columnar lens array of the liquid crystal optical device in accordance with an embodiment of the present disclosure.

The interference pattern obtained by using the liquid crystal lens array in this embodiment is shown in FIG. 17, from which it can be seen that the liquid crystal lens array in this application can achieve a good columnar lens array performance.

Embodiment 3

This embodiment provides an alternative form of a liquid crystal optical device array, in which the liquid crystal optical device array includes the liquid crystal optical device 100 described in Embodiment 1, and the leading-out lines 62 of the liquid crystal optical device 100 are extended to form a plurality of extension segments which are arranged in an array. The resistance between each leading-out position on the conductive line 61 and the first position 611 and the distance between at least a part of each extension segment in the first direction and the first position 611 satisfy the condition corresponding to the extension segment.

In this embodiment, the multiple liquid crystal optical devices 100 can be finally obtained by extending the leading-out lines 62 of the liquid crystal optical devices 100 of Embodiment 1 to form multiple extension segments each of which can control the potential distribution in the corresponding area and thus drive liquid crystal molecules to deflect in the liquid crystal layer 40 in the corresponding area. The potential distribution formed by each extension segment can be the same as each other or different from each other, which is not limited herein. Since the distance between each extension segment and the first position 611 on the conductive line 61 in the first direction is different from each other, even if the potential distribution formed by each extension segment is the same as each other, there is a certain difference in the condition satisfied by the resistance between each leading-out position on the conductor line 61 to the first position 611 and the distance between at least a part of each extension segment in the first direction and the first position 611. Thus, in this embodiment, the condition corresponding to each extension segment can be set separately.

For example, when the liquid crystal cylindrical lens array is desired, the corresponding condition can be set as follows: the resistance between each leading-out position on the conductive line 61 and the first position 611 is in parabolic correlation with the distance between at least a part of each leading-out line 62 in the first direction and the first position 611 with the offset distance of the extension segment being subtracted therefrom, and the parts of the leading-out lines 62 are parallel to each other.

By taking the extension segment closest to the first position 611 as the initial extension segment 610, the offset distance of a certain extension segment is the distance between the position of the same leading-out line 62 in the first direction and the position of the initial extension segment 610.

Figure 16:
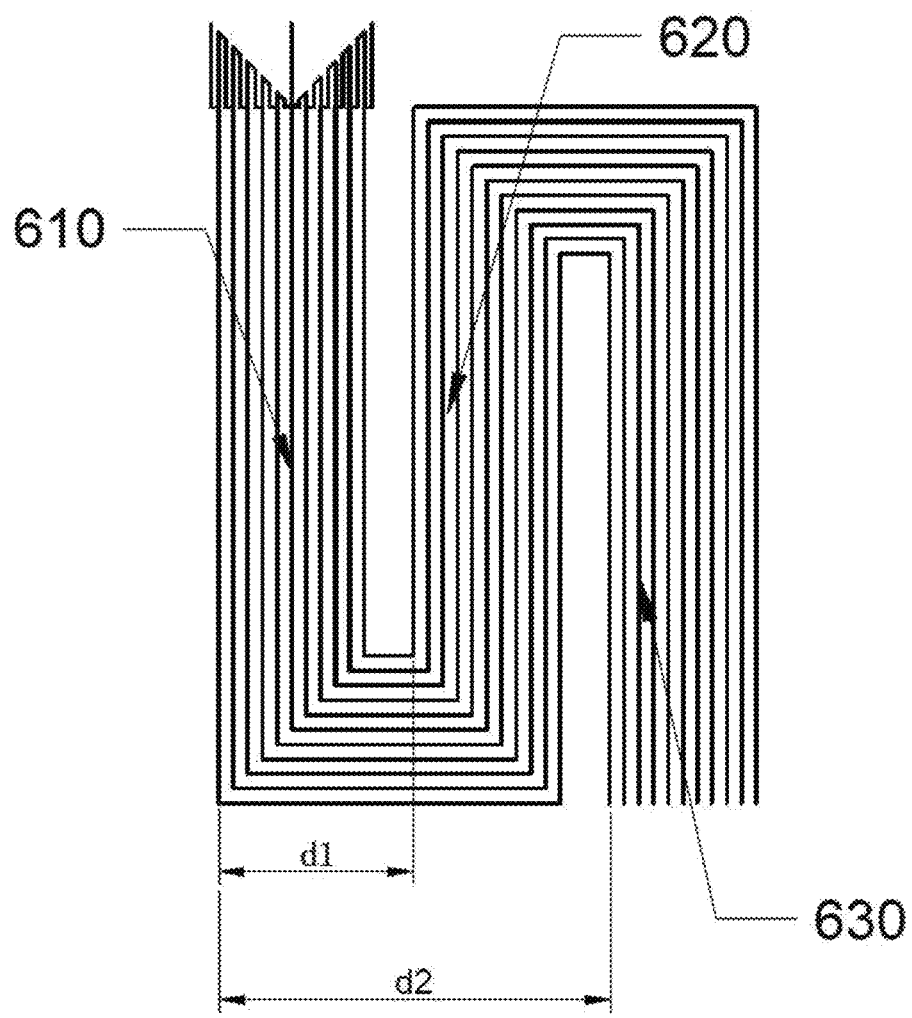
FIG. 16 is a schematic view of a liquid crystal optical device array in Embodiment 3 of the present disclosure.

FIG. 16 is used as an example. As shown in FIG. 16, supposed that three extension segments are arranged in an array, namely the initial extension segment 610, a first extension segment 620, and a second extension segment 630. The offset distance of the first extension segment 620 is d1, and the offset distance of the second extension segment 630 is d2.

When a liquid crystal cylindrical lens array is desired, in the case that the width of conductive line 61 remains unchanged, the above corresponding conditions can also be set as: the length between each leading-out position and the first position 611 on the conductive line 61 is in parabolic correlation with the distance between at least a part of each leading-out line 62 in the first direction and the first position 611 with the offset distance of the extension segment being subtracted therefrom, the parts of the leading-out lines 62 are parallel to each other.

By using the above structure, each liquid crystal optical device 100 can form an accurate parabolic cylinder distribution to obtain a better liquid crystal cylindrical lens.

In this embodiment, the first driving voltage and the second driving voltage of each liquid crystal lens 100 are the same as each other, thus, the optical power of each liquid crystal lens and the switching between the positive lens and the negative lens can be controlled by only controlling two driving voltages. For specific controlling methods, see Embodiment 4. When the above cylindrical lens array is used, the optical power of each liquid crystal lens and the switching between the positive lens and the negative lens can also be controlled by controlling the first driving voltage and the second driving voltage.

Embodiment 4

Figure 18:
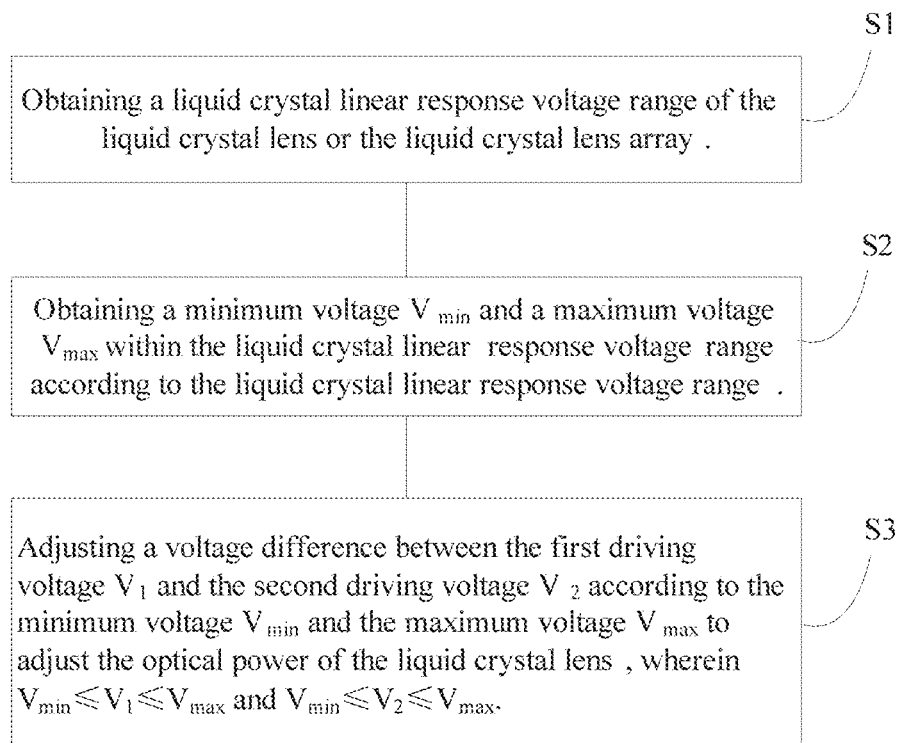
FIG. 18 is a flowchart view of a driving method of a liquid crystal optical device array or a liquid crystal optical device in accordance with an embodiment of the present disclosure.

As shown in FIG. 18, in an embodiment, the present disclosure provides a driving method of a liquid crystal optical device or a liquid crystal optical device array. The method is used to drive the liquid crystal optical device described in Embodiment 1. The liquid crystal optical device is a liquid crystal lens, the liquid crystal optical device array is a liquid crystal lens array, the first driving voltage is set as $V_1$ and the second driving voltage as $V_2$, as shown in FIG. 18. The method includes steps as follows.

Step S1, obtaining a liquid crystal linear response voltage range of the liquid crystal lens or the liquid crystal lens array.

The liquid crystal linear response voltage range refers to the voltage range in which the liquid crystal phase delay is in linear correlation with the driving voltage.

Step S2, obtaining a minimum voltage $V_{min}$ and a maximum voltage $V_{max}$ within the liquid crystal linear response voltage range according to the liquid crystal linear response voltage range.

Step S3, adjusting a voltage difference between the first driving voltage $V_1$ and the second driving voltage $V_2$ according to the minimum voltage $V_{min}$ and the maximum voltage $V_{max}$ to adjust the optical power of the liquid crystal lens, wherein $V_{min} \leq V_1 \leq V_{max}$ and $V_{min} \leq V_2 \leq V_{max}$.

The optical power of the liquid crystal lens or the liquid crystal lens array by adjusting the voltage difference between $V_1$ and $V_2$. In different embodiments, $V_1$ can be kept unchanged and $V_2$ is adjusted; or, $V_2$ can be adjusted and $V_1$ is kept unchanged, or, both $V_1$ and $V_2$ can be adjusted. When $V_1$ is kept unchanged and $V_2$ is adjusted, it can be set as $V_1=V_{min}$ or $V_1=V_{max}$. When $V_1$ is adjusted and $V_2$ is kept unchanged, it can be set as $V_2=V_{min}$ or $V_2=V_{max}$. Furthermore, the liquid crystal lens can be switched between the positive lens state and the negative lens state by adjusting the voltage difference between $V_1$ and $V_2$.

Embodiment 5

In an embodiment, the present disclosure provides a liquid crystal optical device. The liquid crystal optical device includes a liquid crystal layer 40, a first orientation layer 30, a second orientation layer 50, a first electrode layer 20, a second electrode layer 60, a first transparent substrate 10 and a second transparent substrate 70. The first orientation layer 30 and the second orientation layer 50 are respectively located on opposite sides of the liquid crystal layer 40. The first electrode layer 20 is located on one side of the first orientation layer 30 facing away from the liquid crystal layer 40, and the second electrode layer 60 is located on one side of the second orientation layer 50 facing away from the liquid crystal layer 40. The first transparent substrate 10 is located on one side of the first electrode layer 20 facing away from the liquid crystal layer 40, and the second transparent substrate 70 is located on one side of the second electrode layer 60 facing away from the liquid crystal layer 40. The liquid crystal optical device in this embodiment may use the same layered structure as in Embodiment 1.

In this embodiment, two electrode units 91 can be respectively arranged in the first electrode layer 20 and in the second electrode layer 60.

As shown in FIG. 2, either the electrode unit 90 in the first electrode layer 20 or the electrode unit 90 in the second electrode layer 60 includes a conductive line 61 and multiple leading-out lines 62. The conductive line 61 includes a first position 611 and a second position 612. The first position 611 is different from the second position 612. One end of the leading-out line 62 is connected with the conductive line 61, and the other end thereof is suspended. A position of the conductive line 61 at which the conductive line 61 is connected with each leading-out line 62 is a leading-out position, and at least a part of the leading-out position is located between the first position 611 and the second position 612 of the conductive line 61. In this embodiment, the number of leading-out lines 62 of a single electrode unit is greater than or equal to 2.

Figure 21:
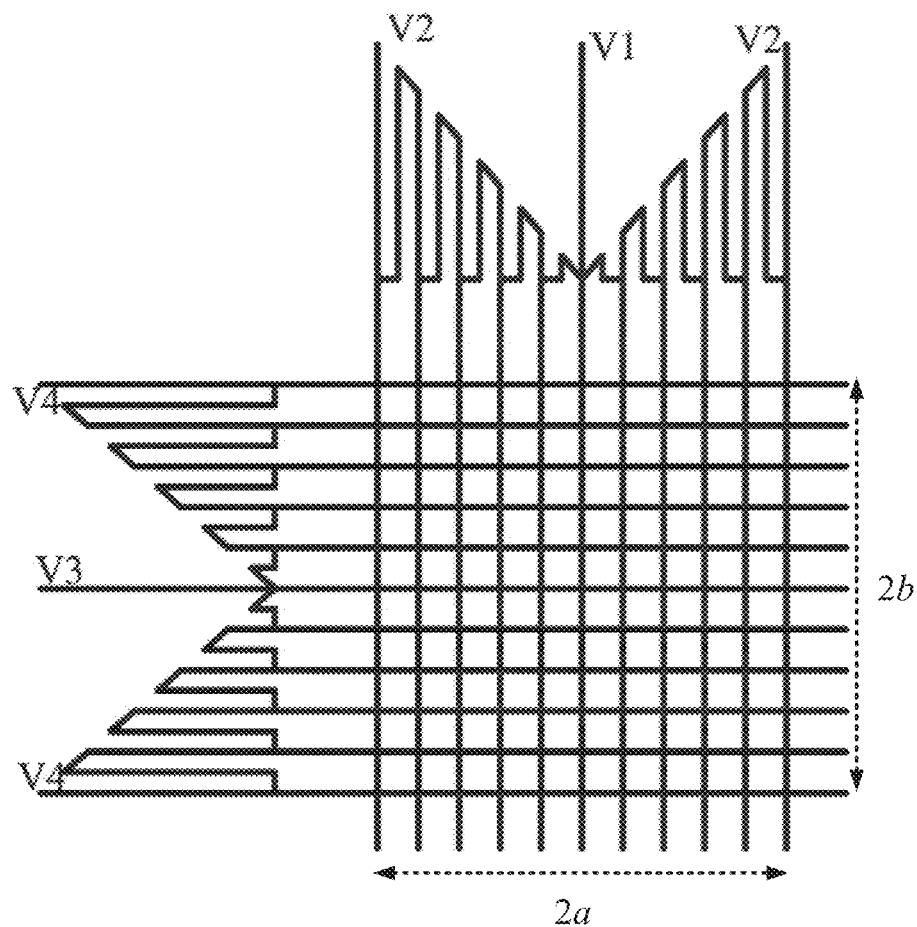
FIG. 21 is a projection view of electrode units in the first electrode layer and the second electrode layer of Embodiment 5.

As shown in FIG. 21, in the present embodiment, the first position 611 and the second position 612 of the conductive line 61 in the first electrode layer 20 are respectively configured to receive a first driving voltage and a second driving voltage. The first position 611 and the second position 612 of the conductive line 61 in the second electrode layer 60 are respectively configured to receive a third driving voltage and a fourth driving voltage.

In this embodiment, the first driving voltage and the second driving voltage can be applied respectively at two different positions on the conductive line 61 in the first electrode layer 10, namely the first position 611 and the second position 612.

When the two driving voltages are applied to the conductive line 61, different potentials are distributed at different positions on the conductive line 61. Since one end of the leading-out line 62 in this embodiment is connected to the conductive line 61 and the other end thereof is suspended, the potential at each position of the same leading-out line 62 is equal to each other and equal to the potential of the conductive line 61 at the position where the leading-out line 62 is connected to the conductive line 61. In this way, a desired potential of each leading-out line 62 can be obtained by configuring the leading-out position of each leading-out line 62. Each leading-out line 62 can be extended to the needed positions to control the potential distribution at these positions by the potential on the leading-out line 62. For example, the leading-out line 62 is extended to an area where an electric field generated by the leading-out line can drive liquid crystal molecules in liquid crystal optical devices to deflect. Since only a part of the leading-out lines 62 may be used to control the potential distribution in practical applications, only the positions of these leading-out lines can be arranged. Of course, in some embodiments, the positions of all leading-out lines 62 can be arranged according to actual requirements, which is not limited herein. In order to obtain the desired potential distribution using the leading-out line 62, the resistance between each lead-out position on the conductive line 61 and the first position 611 and the distance between at least a part of each leading-out line 62 in the preset direction and the first position 611 satisfy the preset condition in this embodiment. When the first driving voltage and the second driving voltage are applied to the conductive line 61, the potential at each position on the conductive line 61 is determined by the resistance between each leading-out position on the conductive line 61 and the first position 611. Therefore, the spatial potential distribution can be controlled by setting the preset condition by which the distance between a certain part of each leading-out line 62 or all parts of each leading-out line 62 and the first position 611 and the above resistance satisfy.

Similarly, in this embodiment, the third driving voltage and the fourth driving voltage can be applied respectively at two different positions on the conductive line 61 in the second electrode layer 70, namely the first position 611 and the second position 612. After the driving voltages are applied, the potential at each position on the conductive line 61 of the second electrode layer is determined by the resistance between each leading-out position on the conductive line 61 and the first position 611. Therefore, the spatial potential distribution can be controlled by setting the preset condition by which the distance between a certain part of each leading-out line 62 or all parts of each leading-out line 62 and the first position 611 and the above resistance satisfy.

The preset direction can be set according to actual need. For example, when it is necessary to control the potential distribution at various positions in a certain direction in the space where the liquid crystal optical device is located, the certain direction can be defined as the preset direction. In this embodiment, the preset direction of the electrode unit 91 in the first electrode layer 20 is different from that of the electrode unit 91 in the second electrode layer 60. The preset condition satisfied by the electrode unit 91 in the first electrode layer 20 and the preset condition satisfied by the electrode unit 91 in the second electrode layer 60 can be the same as each other or different from each other. In this embodiment, the potential distribution is controlled by the cooperation between the electrode unit 91 in the first electrode layer 20 and the electrode unit 91 in the second electrode layer 60. Various accurate potential distributions can be obtained by setting the preset conditions satisfied by the two electrode units 91 respectively, thereby obtaining various optical devices with different functions and good effects.

Figure 22:
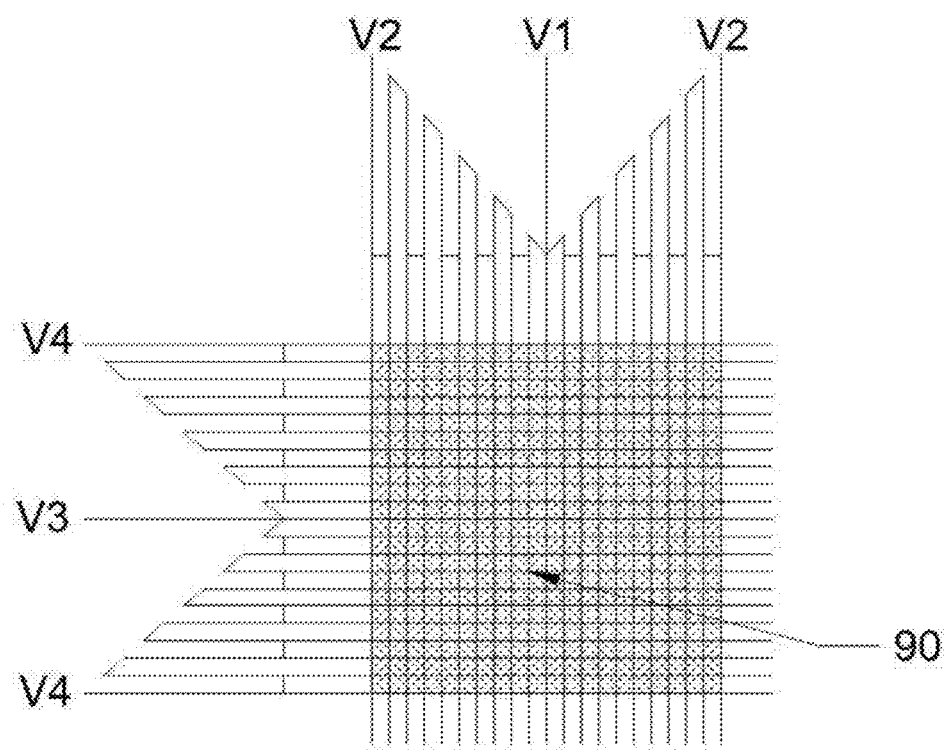
FIG. 22 is a schematic view of a overlapping area of the projection of the electrode unit in the first electrode layer and the second electrode layer of Embodiment 5.

As shown in FIG. 21 and FIG. 22, in an embodiment, the present disclosure also provides a parabolic liquid crystal lenses or a liquid crystal conical lens obtained by improving the above embodiment. In this case, each leading-out line 62 in at least one area of the electrode unit 91 is straight and perpendicular to the preset direction. The resistance between each leading-out position on the conductive line 61 and the first position 611 in this area is in parabolic correlation or in circular correlation with the distance between each leading-out line 62 in the preset direction of the electrode unit 91 and the first position 611. The preset direction of the electrode unit 91 in the first electrode layer 20 is perpendicular to the preset direction of the electrode unit 91 in the second electrode layer 60. The projection of the preset area of the first electrode layer 20 on the second reference plane and the projection of the preset area of the second electrode layer 60 on the second reference plane are at least partially overlapped. The second reference plane is parallel to the leading-out line 62 of the first electrode unit 91 and the leading-out line 62 of the second electrode unit 91.

The preset area can be set according to actual needs without limitations. For example, a functional area of the liquid crystal lens can be used as the preset area, or the functional area of the liquid crystal lens can be set in the preset area. In order to realize a spherical or parabolic liquid crystal lens, the leading-out line 62 in the preset area as straight and perpendicular to the preset direction. The resistance between each leading-out position on the conductive line 61 and the first position 611 in this area is in parabolic correlation or in linear correlation with the distance between each leading-out position 62 and the first position 611 in the preset direction of the electrode unit 91.

A parabolic liquid crystal lens can be obtained if the resistance between each leading-out position on the conductive line 61 and the first position 611 is in parabolic correlation with the distance between each leading-out position 62 and the first position 611 on the preset direction of the electrode unit 91. A liquid crystal conical lens can be obtained if the resistance between each leading-out position on the conductive line 61 and the first position 611 is in linear correlation with the distance between each leading-out position 62 and the first position 611 on the preset direction of the electrode unit 91.

As shown in FIG. 2, in this embodiment, the conductive line 61 also includes the third position 613, the first position 611 is located between the third position 613 and the second position 612, and at least a part of the leading-out position is located between the second position 612 and the third position 613. The third position 613 of the conductive line 61 in the first electrode layer 20 is used to receive the second driving voltage, and the third position 613 of the conductive line 61 in the second electrode layer 60 is used to receive the fourth driving voltage.

The conductive line and the leading-out line of the electrode units in the first electrode layer and the second electrode layer of this embodiment may have the same structures as those in Embodiment 1 or have any of the structures in FIG. 2 to FIG. 13. For descriptions of these structures, see Embodiment 1.

As shown in FIG. 19, when the preset condition is that the resistance between each leading-out position on the conductive line 61 and the first position 611 is in linear correlation with the distance between at least a part of each leading-out line 62 and the first position 611 in the preset direction, the potential formed by the leading-out line 62 in the preset direction is in linear distribution.

When the potentials formed by the electrode units 91 in the two electrode layers are both in linear distributions and the preset directions of the electrode unit 91 in the two electrode layer are perpendicular to each other, the potentials of the two electrode layers are overlapped to form a potential in parabolic distribution.

When the potentials of the electrode unit 91 in the two electrode layers are both in linear distributions and the preset directions of the electrode units 91 in the two electrode layers are perpendicular to each other, the potentials of the two electrode layers are overlapped to form a potential in conical distribution.

In this embodiment, the overlapping area 90 of the projection of the leading-out line 62 of the first electrode unit 91 and the projection of the leading-out line 62 of the second electrode unit 91 on the second reference plane is a square.

In this embodiment, the overlapping area 90 of the projection of the leading-out line 62 of the first electrode unit 91 and the projection of the leading-out line 62 of the second electrode unit 91 on the second reference plane can be used as the functional area of the liquid crystal optical device to implement light modulation. For example, in FIG. 22, the shaded area is the overlapping area 90.

When the leading-out line 62 is straight and perpendicular to the preset direction, and the preset direction of the electrode unit 91 in the first electrode layer 20 is perpendicular to the preset direction of the electrode unit 91 in the second electrode layer 60, the overlapping area 90 is a rectangle, and when the sides of the adjacent sides of the rectangle are equal to each other, the overlapping area is a square.

Embodiment 6

Figure 23:
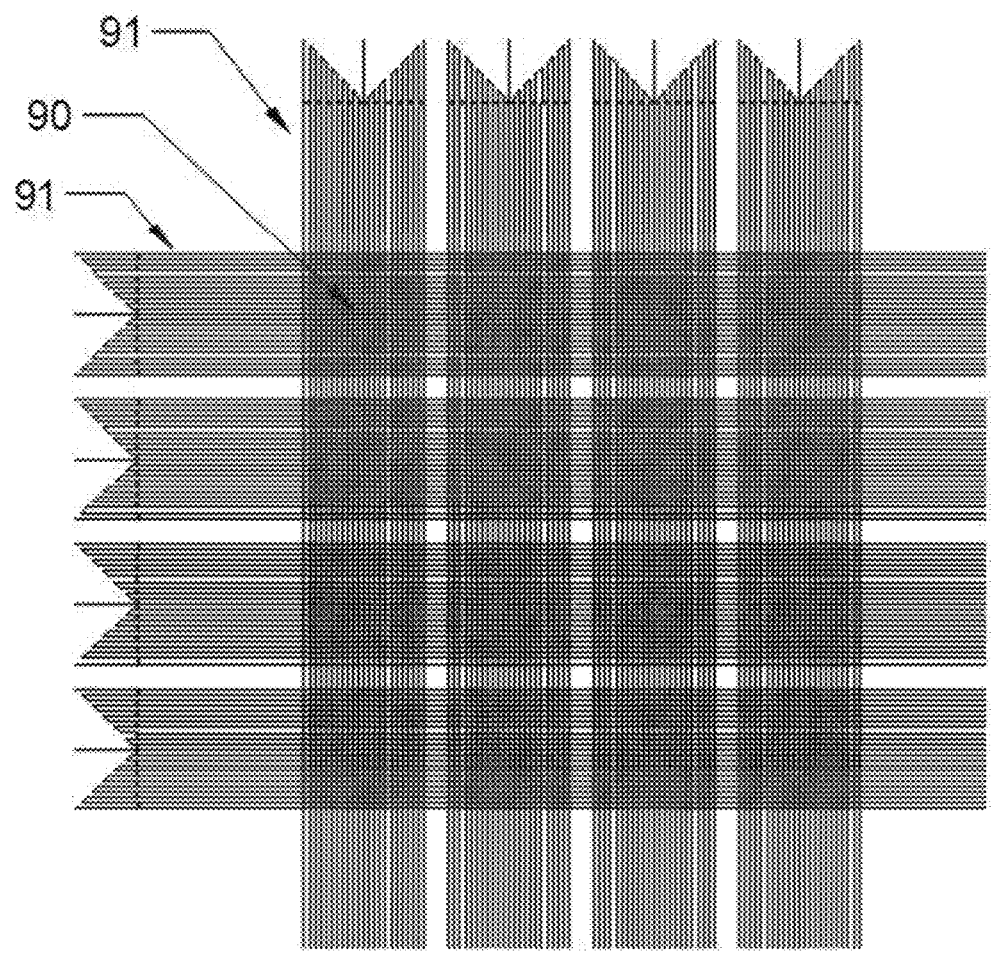
FIG. 23 is a schematic view of a liquid crystal optical device array in Embodiment 6.

As shown in FIG. 23, in an embodiment, the present disclosure further provides a liquid crystal optical device array including the liquid crystal optical device described in Embodiment 1, and at least one of the first electrode layer 20 and the second electrode layer 60 includes at least two electrode units 91. The projections of the leading-out lines 62 in the first electrode layer 20 on the second reference plane and the projections of the leading-out lines 62 in the second electrode layer 60 on the second reference plane forms a plurality of overlapping areas 90 arranged in an array.

In this embodiment, one electrode unit 91 may be arranged in one of the electrode layers, and two or more electrode units 91 may be arranged in the other electrode layer, or two or more electrode units 91 may be arranged in each electrode layer. Each electrode unit 91 in the two electrode layers can form the multiple overlapping areas 90 arranged in an array. In these overlapping areas 90, the potentials of the two electrode layers are superimposed on each other, so that the electric field generated by the potentials distributed in the overlapping areas 90 can drive the deflection of liquid crystal molecules and thus form a series of liquid crystal lenses.

The preset conditions of the overlapping areas 90 in the liquid crystal optical device array can be the same as each other or different from each other, which is not limited herein. When the preset conditions satisfied by the overlapping areas 90 in the liquid crystal optical device array are the same as each other, the overlapping areas 90 have the same optical effects. When the preset conditions satisfied by the overlapping areas 90 in the liquid crystal optical device array are not completely the same, the optical effects of the overlapping areas 90 in the array are not completely the same.

As shown in FIG. 23, in an embodiment, a potential in paraboloid distribution is formed in each overlapping area 90 when: in each overlapping area 90, each leading-out line 62 is straight and perpendicular to the preset direction; the resistance between each leading-out position on the conductive line 61 and the first position 611 in this overlapping area is in parabolic correlation with the distance between each leading-out line 62 and the first position 611; and the preset direction of the electrode unit 91 in the first electrode layer 20 is perpendicular to the preset direction of the electrode unit 91 in the second electrode layer 60.

Similarly, a potential in linear distribution is formed in each overlapping area 90 when each leading-out line 62 in each overlapping area 90 is straight line and perpendicular to the preset direction; the resistance between each leading-out position on the conductive line 61 in this overlapping area and the first position 611 is in linear correlation with the distance between each leading-out line 62 and the first position 611 in the preset direction of the electrode unit 91; and the preset direction of the electrode unit 91 in the first electrode layer 20 is perpendicular to the preset direction of the electrode unit 91 in the second electrode layer 60.

In an embodiment, under the condition that the width of the conductive line 61 remains unchanged, the length between each leading-out position and the first position 611 on the conductive line 61 is in linear correlation or in parabolic correlation with the distance between at least a part of each leading-out line 62 in the first direction and the first position 611. Thus, a parabolic liquid crystal lens array or conical liquid crystal lens array is obtained. The aperture and interval of the liquid crystal lens can be adjusted according to the need.

Figure 29:
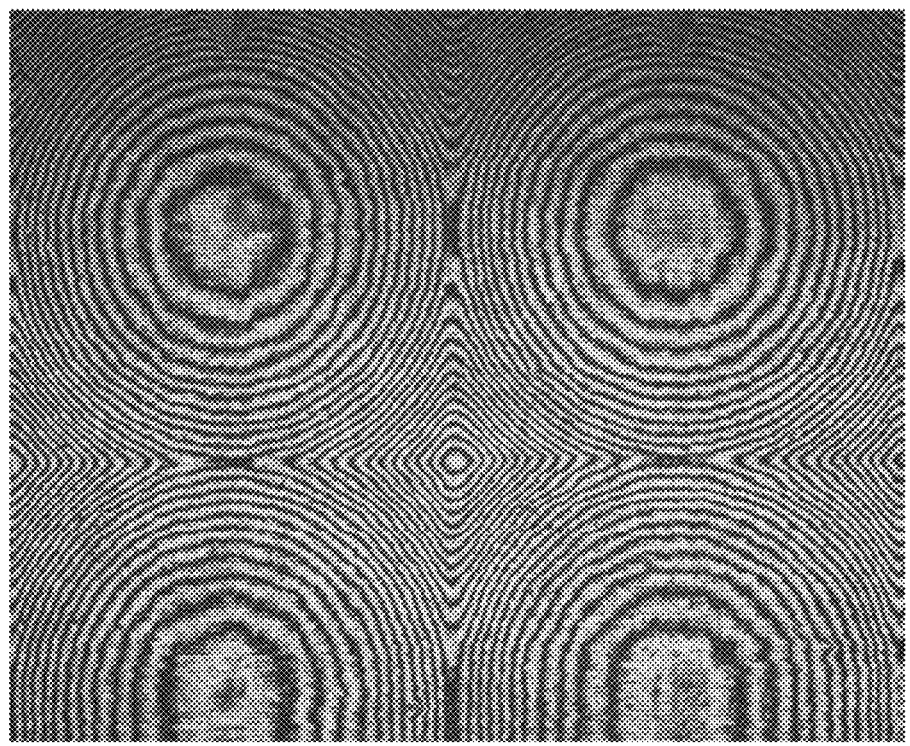
FIG. 29 is a schematic view showing the interference pattern of the liquid crystal lens array in accordance with an embodiment of the present disclosure.

By using the above structure in this embodiment, an accurate parabolic or spherical distribution of potential can be formed in each overlapping area, resulting in a more effective liquid crystal lens array. The effect can be seen in the interference pattern of the liquid crystal lens array in FIG. 29.

Embodiment 7

Figure 24:
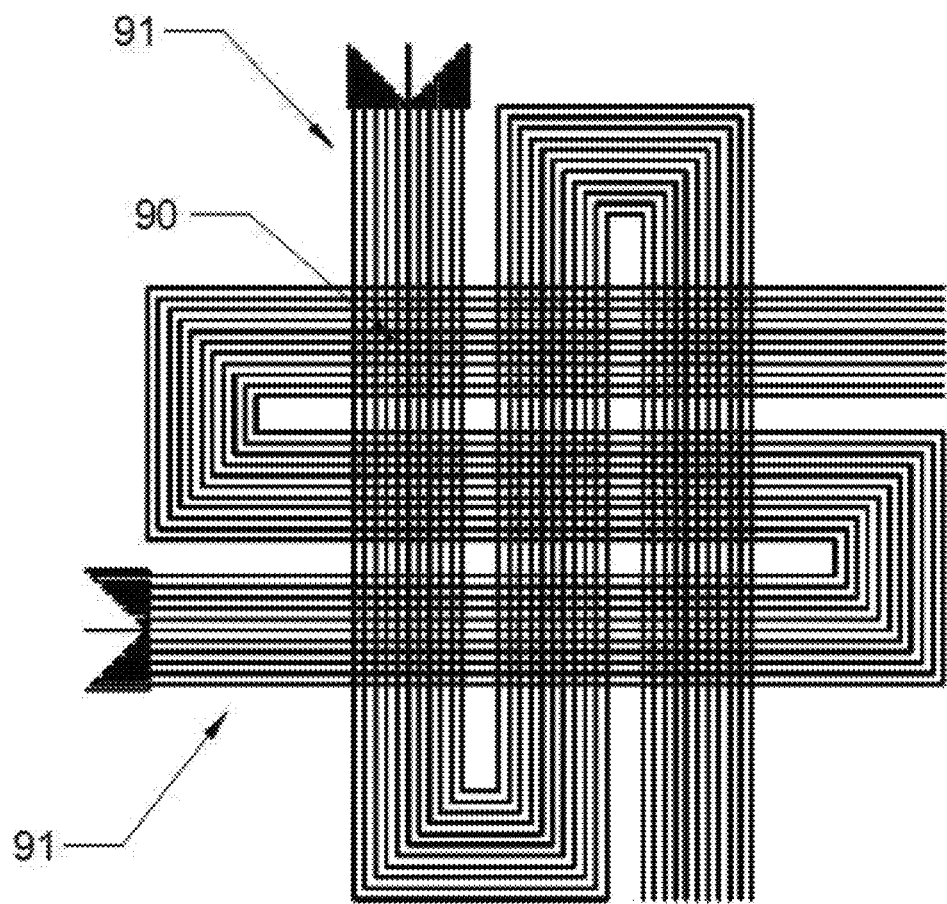
FIG. 24 is a schematic view of a liquid crystal optical device array in Embodiment 7.

As shown in FIG. 24, in an embodiment, the present disclosure provides another liquid crystal optical device array, including the liquid crystal optical device described in Embodiment 1, wherein the leading-out line 62 of the electrode unit 91 in at least one of the first electrode layers 20 and the second electrode layer 60 are extended to form a plurality of extension segments. The resistance between each leading-out position on the conductive line 61 and the first position 611 and the distance between at least a part of each extension segment up the preset and the first position 611 satisfy the preset condition corresponding to the extension segment. The projections of the extension segments of the electrode unit 91 in the first electrode layer 20 on the second reference plane and the projections of the extension segments of the electrode unit 91 in the second electrode layer 60 on the second reference plane form a plurality of overlapping areas 90 arranged in an array.

The leading-out lines 62 of the liquid crystal optical device 100 in Embodiment 1 can be further extended to form the multiple extension segments through. Each extension segment can control the potential distribution in the corresponding area, thus driving the liquid crystal molecules in the liquid crystal layer 40 in the area to deflect. The projections of the extension segments in the two electrode layers on the second reference plane form the overlapping areas 90, each of which correspond to an optical device 100. The potential distribution of each extension segment can be the same as each other or different from each other, which is not limited herein. Since the distance between each extension segment and the first position 611 on the conductive line 61 in the first direction is different from each other, even if the potential distribution formed by each extension segment is the same as each other, there is also a certain difference between the resistance between each leading-out position on the conductor line 61 and the first position 611 and the conditions satisfied by the distance between at least a part of each extension segment in the preset direction and the first position 611. In this embodiment, the preset condition corresponding can be separately set for each extension segment.

For example, when a parabolic lens array is desired, the corresponding condition can be set as follows: in each overlapping area, the resistance between each leading-out position on the conductive line 61 and the first position 611 is in parabolic correlation with the distance between at least a part of each leading-out line 62 in the first direction and the first position 611 with the offset distance of the extension segment being subtracted therefrom.

By taking the extension segment closest to the first position 611 as the initial extension segment 610, and the offset distance of a certain extension segment be equal to the distance between the position of the same leading-out line 62 in the first direction and the position of the initial extension segment 610.

By taking an electrode unit including multiple extension segments in FIG. 16 an example, supposed that three extension segments in FIG. 16 are arranged in an array, namely, the initial extension segment 610, the first extension segment 620 and the second extension segment 630. The offset distance of the first extension segment 620 is d1 and the offset distance of the second extension segment 630 is d2.

When a parabolic lens array is desired, under the condition that the width of the conductive line 61 remains unchanged, the corresponding preset condition can also be set as: the length between each leading-out position and the first position 611 on the conductive line 61 is in parabolic correlation with the distance between each leading-out line 62 and the first position 611 in the preset direction with the offset distance of the extension segment being subtracted therefrom. The liquid crystal conical lens array can be obtained when the preset condition satisfies the linear distribution. The aperture and interval of the liquid crystal lens can be adjusted according to the need.

By using the above structure in this embodiment, an accurate parabolic or conical distribution of potential can be formed in each overlapping area, resulting in a more effective liquid crystal lens array.

Embodiment 8

The present embodiment provides a driving method of a liquid crystal optical device or a liquid crystal optical device array. The method is used to drive the liquid crystal optical device array of Embodiment 5 or the liquid crystal optical device array of Embodiments 6 and 7. The liquid crystal optical device is a liquid crystal lens, the liquid crystal optical device array is a liquid crystal lens array, and the first driving voltage, the second driving voltage, the third driving voltage, and the fourth driving voltage are respectively set as $V_1$, $V_2$, $V_3$ and $V_4$. The method includes the following steps:

Step S1, obtaining a liquid crystal linear response voltage range of the liquid crystal optical device or the liquid crystal optical device array.

Step S2, obtaining a minimum voltage $V_{min}$ and a maximum voltage $V_{max}$ within the liquid crystal linear response voltage range according to the liquid crystal linear response voltage range.

Step S3, adjusting a voltage difference between $V_1$ and $V_2$ and a voltage difference between $V_3$ and $V_4$ according to the minimum voltage $V_{min}$ and the maximum voltage $V_{max}$ to adjust an optical power of the liquid crystal optical device or liquid crystal optical device array and/or switch the liquid crystal optical device or liquid crystal optical device between a positive lens state and a negative lens state, wherein $$V_{min} \leq |V_1 - V_3| \leq V_{max}, V_{min} \leq |V_2 - V_4| \leq V_{max}.$$

The optical power of the liquid crystal lens or liquid crystal lens array can be adjusted by adjusting the voltage difference between $V_1$ and $V_2$ and the voltage difference between $V_3$ and $V_4$. In addition, the embodiment the liquid crystal lens can also be switchable between the positive lens state and the negative lens state by changing the voltage difference between $V_1$ and $V_2$ and the voltage difference between $V_3$ and $V_4$.

Figure 25:
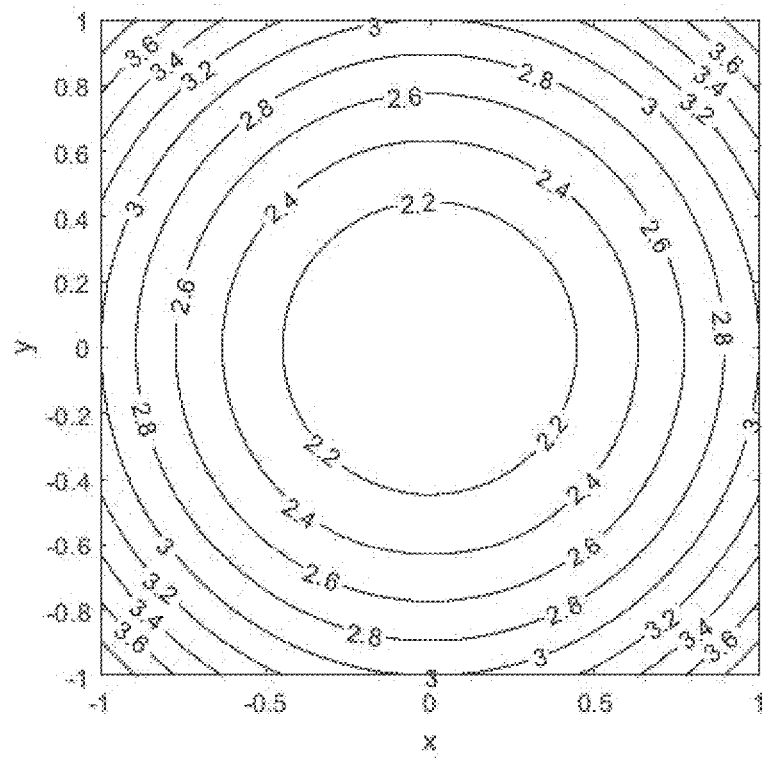
FIG. 25 is a schematic view showing potential distribution when the liquid crystal circular lens is in a positive lens state.
Figure 26:
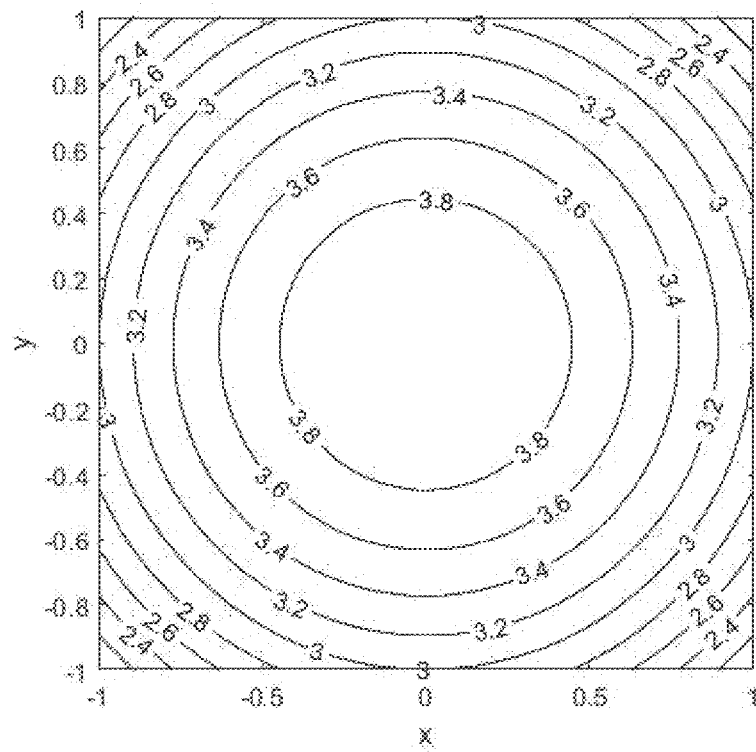
FIG. 26 is a schematic view showing potential distribution when the liquid crystal circular lens is in a negative lens state.
Figure 27:
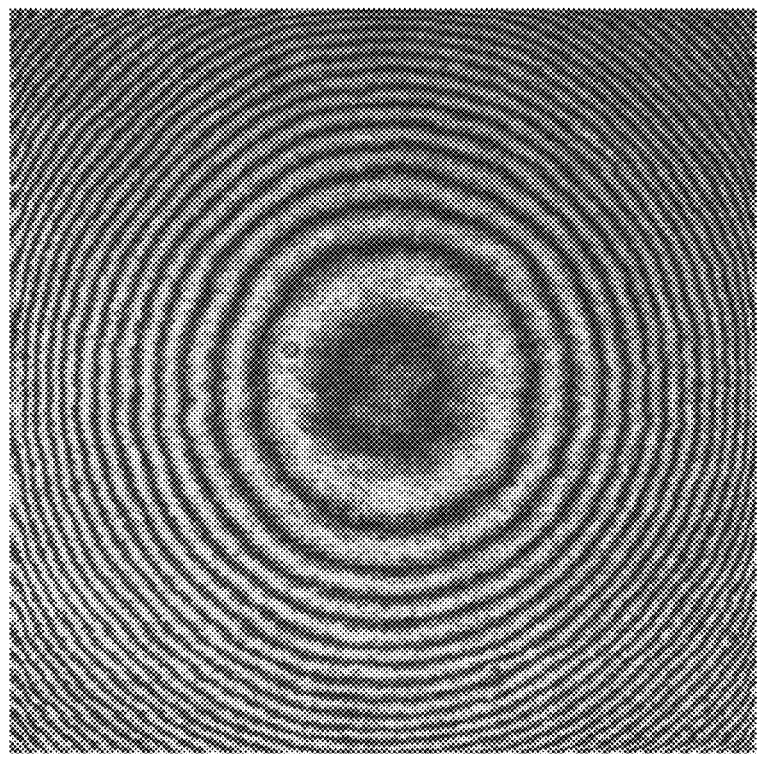
FIG. 27 is a schematic view showing the interference pattern of the liquid crystal circular lens when the liquid crystal circular lens is in the positive lens state.
Figure 28:
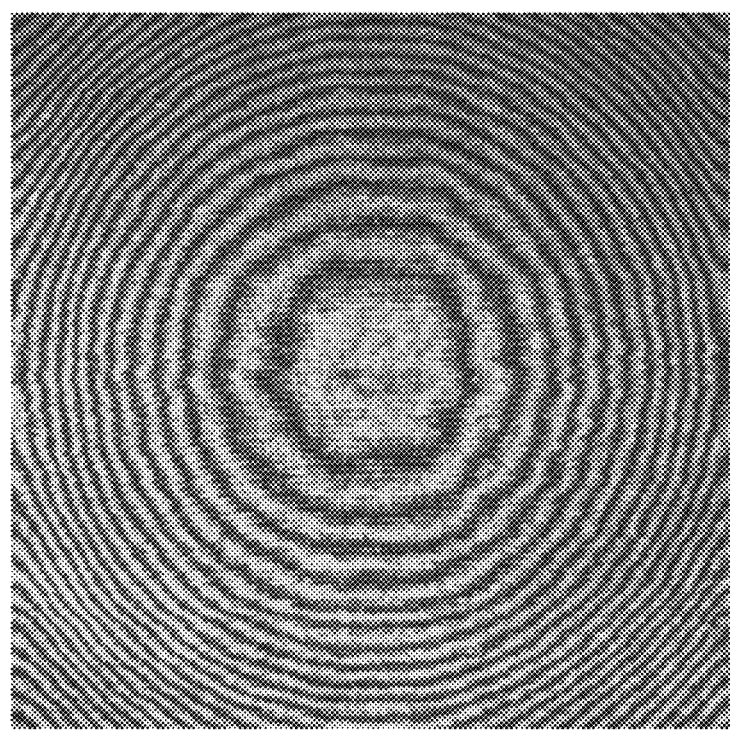
FIG. 28 is a schematic view showing the interference pattern of the liquid crystal circular lens when the liquid crystal circular lens is in the negative lens state.

The potential distribution of the liquid crystal lens in the positive lens state is shown in FIG. 25, of which the interference pattern is shown in FIG. 27; and the potential distribution of the liquid crystal lens in the negative lens state is shown in FIG. 26, of which the interference pattern is shown in FIG. 28.

When the projection of the leading-out line of the first electrode layer on the second reference plane and the leading-out line of the second electrical layer on the second reference plane is a rectangular area, the step S3 includes steps as follows.

Step S31, obtaining a length 2a and a width 2b of the rectangular area.

The length 2a of the rectangular area can be equal to or different from the width 2b of the rectangular area, which is not limited herein. When the length 2a is equal to the width 2b, the overlapping area is a square.

Step S32, determining magnitudes of the first driving voltage $V_1$, the second driving voltage $V_2$, the third driving voltage $V_3$ and the fourth driving voltage $V_4$ according to the length 2a and the width 2b of the rectangular area wherein $(V_2 - V_1)/a^2 = (V_3 - V_4)/b^2$.

In this embodiment, the liquid crystal circular lens or liquid crystal circular lens array can be obtained by using the above-mentioned driving method.

Embodiment 9

As shown in FIG. 1, in an embodiment, the present disclosure provides a liquid crystal lens which belongs to a type of liquid crystal optical device. The liquid crystal lens in the present embodiment includes a liquid crystal layer 40, a first orientation layer 30, a second orientation layer 50, a first electrode layer 20, a second electrode layer 60, a first transparent substrate 10 and a second transparent substrate 70. The first orientation layer 30 and the second orientation layer 50 are respectively located on opposite sides of the liquid crystal layer 40, the first electrode layer 20 is located on one side of the first orientation layer 30 facing away from the liquid crystal layer 40, the second electrode layer 60 is located in on one side of the second orientation layer 50 facing away from the liquid crystal layer 40. The first transparent substrate 10 is located on one side of the first electrode layer 20 facing away from the liquid crystal layer 40, and the second transparent substrate 70 is located on one side of the second electrode layer 60 facing away from the liquid crystal layer 40.

The liquid crystal lens in this embodiment may have the same layered structure as in Embodiment 1.

Figure 30:
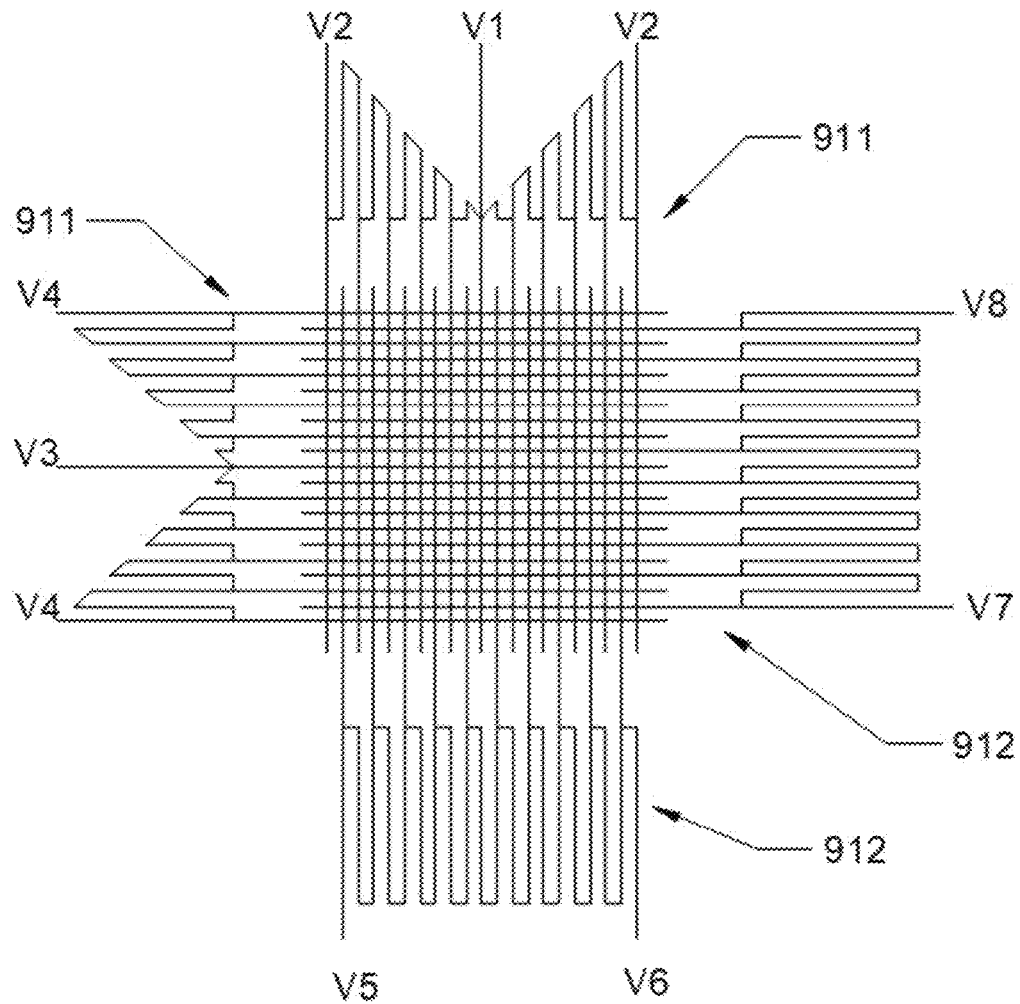
FIG. 30 is a projection view of the electrode unit group of the first electrode layer and the second electrode layer in Embodiment 9.
Figure 31:
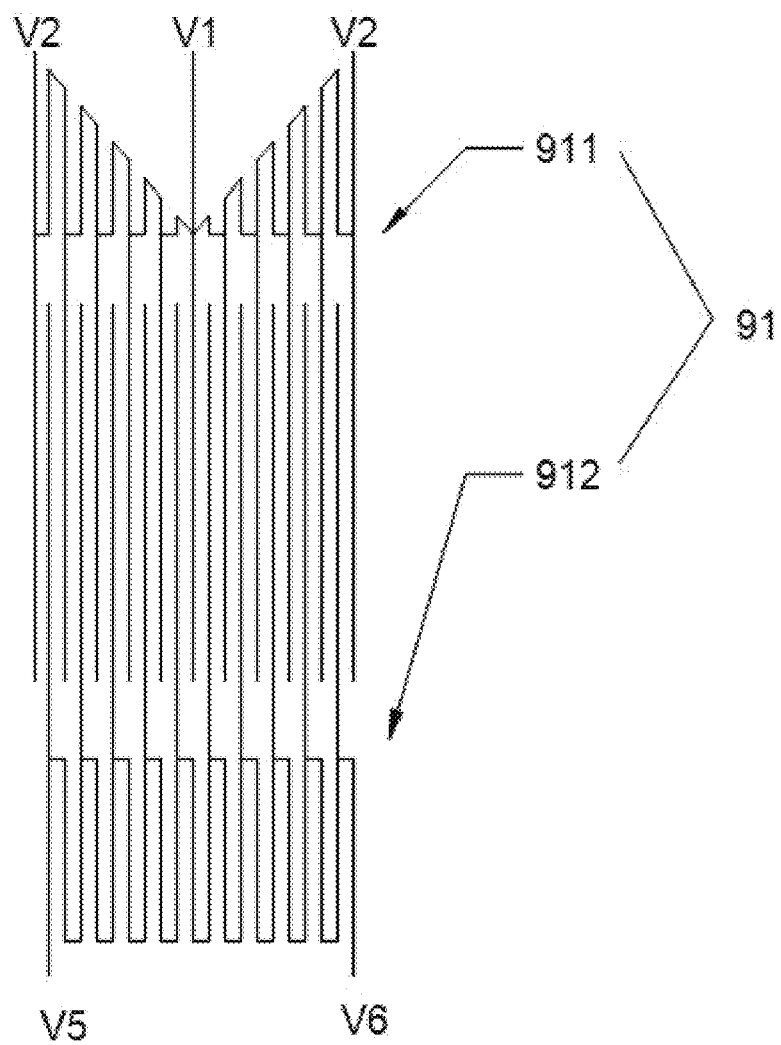
FIG. 31 is a schematic view of the electrode unit group in Embodiment 9.
Figure 32:
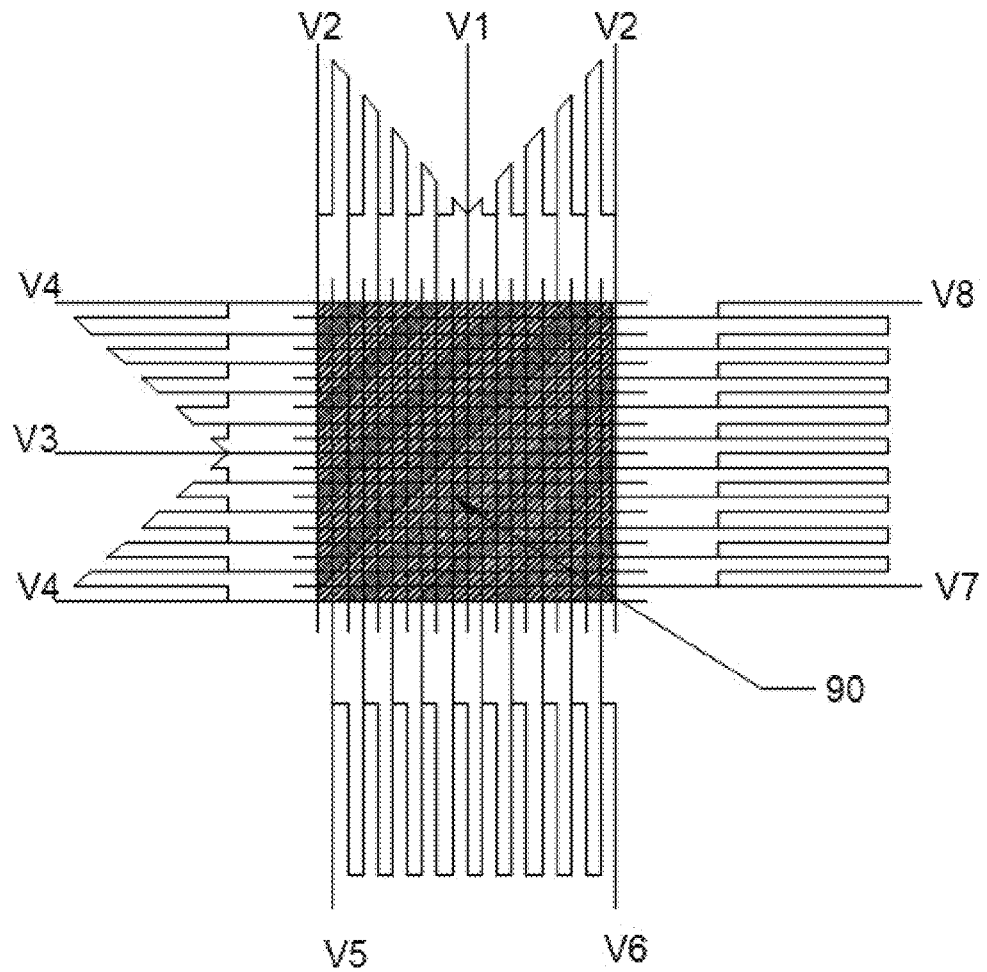
FIG. 32 is a schematic view of the overlapping area of the projection of the electrode unit group in the first electrode layer and the second electrode layer in Embodiment 9.
Figure 33:
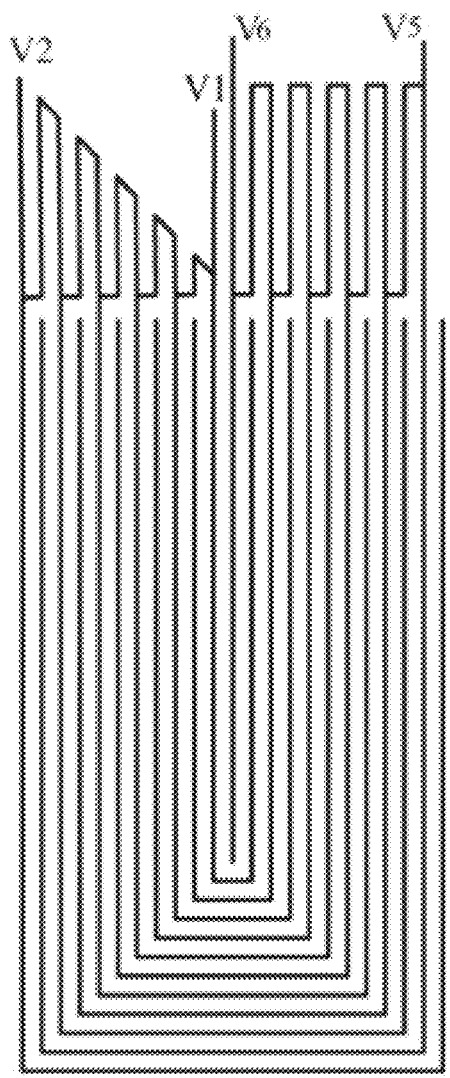
FIG. 33 is a schematic view of the structure of an electrode unit group using a half conductive line in Embodiment 9.
Figure 34:
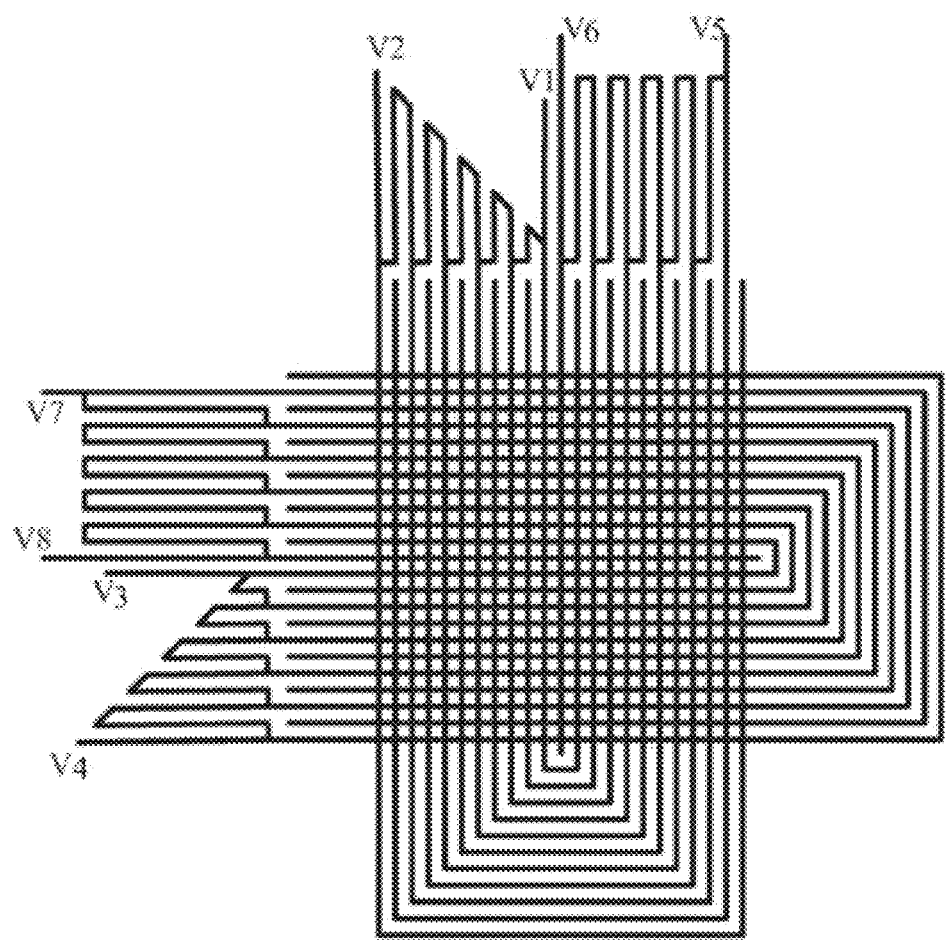
FIG. 34 shows the projection of the electrode unit group in the first electrode layer and the second electrode layer in Embodiment 9.

As shown in FIG. 30, an electrode unit group 91 is provided both in the first electrode layer 20 and the second electrode layer 60 in this embodiment. The electrode unit group 91 in the two electrode layers respectively includes two electrode units, namely the first electrode unit 911 and the second electrode unit 912. As shown in FIG. 30 and FIG. 31, the first electrode unit includes a conductive line 61 and multiple leading-out lines 62, as shown in FIG. 2. The conductive line 61 includes a first position 611 and a second position 612, the first position 611 is different from the second position 612, one end of the leading-out line 62 is connected with the conductive line 61, and the other end thereof is suspended. The position where the leading-out line 62 is connected with the conductive line 61 is a leading-out position. At least a part of the leading-out position is between the first position 611 and the second position 612 of the conductive line 61, and at least two leading-out positions are different from each other.

The first position 611 and the second position 612 of the conductive line 61 of the first electrode unit in the first electrode layer are respectively used to receive a first driving voltage and a second driving voltage.

The first position and the second position of the conductive line 61 of the first electrode unit 911 in the second electrode layer are respectively used to receive a third driving voltage, and a fourth driving voltage.

As shown in FIG. 30 and FIG. 31, the second electrode unit includes a conductive line 61 and a plurality of leading-out lines 62. The conductive line 61 includes a first position and a second position, and the first position is different from the second position. The position where the leading-out line 62 is connected with the conductive line 61 is a leading-out position, and at least a part of the leading-out position is between the first position and the second position of the conductive line 61, and at least two leading-out positions are different from each other.

The first position and the second position of the conductive line 61 of the second electrode unit 912 in the first electrode layer are respectively used to receive a fifth driving voltage and a sixth driving voltage.

The first position and the second position of the conductive line 61 of the second electrode unit 912 in the second electrode layer are respectively used to receive a seventh driving voltage and an eighth driving voltage.

As shown in FIG. 2, after the voltages are respectively applied to the first position 611 and the second position 612 of the conductive line 61 of the first electrode unit 911, the conductive line 61 forms a potential distributed with the position of the conductive line 61. Since one end of the leading-out line 62 is connected to the conductive line 61 and the opposite end thereof is suspended, the potential at each position of the same leading-out line 62 is identical and equal to the potential of the conductive line 61 at the position where the leading-out line 62 is connected to the conductive line 61. In this way, the desired potential of each leading-out line 62 can be obtained by configuring the leading-out position of each leading-out line 62. Each leading-out line 62 can be extended to some needed positions to control the potential distribution at these positions through the potential on the leading-out line 62. For example, the leading-out line 62 is extended to an area where the electric field generated by the leading-out line 62 can deflect the liquid crystal molecules in the liquid crystal lens. In order to obtain the desired potential distribution using the leading-out line 62, in this embodiment, the resistance between each leading-out position on the conductive line 61 and the first position 611 and the distance between certain parts of each leading-out line 62 and the first position 611 in the preset direction satisfy a certain condition. When the corresponding driving voltage is applied to the conductive line 61, the potential at each position on the conductive line 61 is determined by the resistance between each leading-out position on the conductive line 61 and the first position 611. Therefore, the potential distribution in the space can be controlled by setting the condition satisfied by the distance between a certain part of each leading-out line 62 or all parts of each leading-out line 62 and the first position 611.

Similarly, in this embodiment, the corresponding driving voltage can be applied respectively to the first position and the second position of the conductive line 61 of the second electrode unit 912, and the conductive line 61 forms a potential distributed with the position of the conductive line 61. Then, the required potential can be extended to the area where potential control is required through the leading-out line 62 of the second electrode unit 912, such that the resistance between each leading-out position on the conductive line 61 and the first position 611 and the distance between some parts of each leading-out line 62 and the first position 611 in the preset direction satisfy a certain condition to achieve the desired potential distribution.

The above preset direction can be set according to needs. For example, when it is necessary to control the potential distribution at each position in a certain direction in the space where the liquid crystal lens is located, the certain direction can be set as the preset direction, such as the direction x in FIG. 5.

Since the electrode unit groups 91 are used in both electrode layers which can accurately control the potential distribution, a potential in paraboloid distribution or in conical distribution can be obtained through the cooperation between the electrode unit groups 91 in the two electrode layers. For this reason, in the present embodiment, each leading-out line 62 in at least one preset area of the electrode unit group 91 is straight and perpendicular to the preset direction, and in the at least one area, the resistance between each leading-out position on the conductive line 61 of the first electrode unit 911 and the first position of the first electrode unit 911 is in parabolic correlation or in linear correlation with the distance between each leading-out line 62 of the first electrode unit 911 and the first position of the first electrode unit 911 in the preset direction of the electrode unit group 91. The resistance between each leading-out position on the conductive line 61 of the second electrode unit 912 and the first position of the second electrode unit 912 is in linear correlation with the distance between each leading-out line 62 of the second electrode unit 912 and the first position of the second electrode unit 912 in the preset direction of the electrode unit group 91. In the preset area, the leading-out line 62 of the first electrode unit 911 and the leading-out line 62 of the second electrode unit 912 are arranged alternately.

The preset area can be set as required, which is not limited herein. An area requiring high-precision potential control can be set as the preset area. For example, a functional area of the liquid crystal lens can be used as the preset area, or the functional area of the liquid crystal lens can be set in the above preset area. When all leading-out lines 62 in the preset area are straight and perpendicular to the preset direction, the leading-out lines 62 in the preset area are parallel to each other. As shown in FIG. 4, in order to enable the electrode unit groups 91 of the two electrode layers to cooperate with each other, in this embodiment, the projection of the preset area of the first electrode layer on the second reference plane and the preset area of the second electrode layer on the second reference plane is at least partially overlapped to form the overlapping area 90. The second reference plane is parallel to the leading-out line 62 of the first electrode unit 911 and the leading-out line 62 of the second electrode unit 912. The preset direction of the electrode unit group 91 in the first electrode layer is perpendicular to that of the electrode unit group 91 in the second electrode layer. The above overlapping area is the area where the electrode unit groups 91 of the two electrode layers cooperate with each other to control the spatial potential distribution.

Under the cooperation between the two layers of electrode unit groups, a parabolic liquid crystal lens can be obtained when the resistance between each leading-out position on the conductive line 61 of the first electrode unit is in parabolic correlation with the distance between each leading-out line 62 and the first position 611 in the preset direction of the electrode unit 91, and a liquid crystal conical lens can be obtained when the resistance between each leading-out position on the conductive line 61 of the first electrode unit is in linear correlation with the distance between each leading-out line 62 and the first position 611 in the preset direction of the electrode unit 91.

The resistance between each leading-out position of the conductive line 61 of the first electrode unit 911 is in parabolic correlation with the distance between each leading-out line 62 of the first electrode unit 911 and the first position of the first electrode unit 911 in the preset direction of the electrode unit group 91. It means that, in a rectangular coordinate system established with the resistance between the leading-out position and the first position 611 and the distance between at least a part of each leading-out line 62 in the first direction and the first position 611 as axes of the rectangular coordinate system, a curve representing the corresponding relationship between the resistance between each leading-out position on the conductive line 61 and the first position 611 and the distance between at least a part of each leading-out line 62 in the first direction and the first position 611 is a parabola.

The shape, structure and function of the first electrode unit in this embodiment are the same as those of the electrode unit in Embodiment 5. In this embodiment, a second electrode unit is provided based on Embodiment 5.

In order to realize of a movement of a position of an optical axis of the liquid crystal lens, in this embodiment, the conductive line 61 of the second electrode unit 912 is used to generate potential of different sizes, and the leading-out line 62 is extended to the preset area to lead the desired potential to the preset area and superimpose the potential of the first electrode unit 911 in the preset area. In addition, the resistance between each leading-out position on the conductive line 61 of the second electrode unit 912 and the first position of the second electrode unit 912 is in linear correlation with the distance between each leading-out line 62 of the second electrode unit 912 and the first position of the second electrode unit 912 in the preset direction of the electrode unit group 91. Because the leading-out line 62 of the first electrode unit 911 and the leading-out line 62 of the second electrode unit 912 are arranged alternately, the potential generated by the second electrode unit 912 in the preset area can affect the potential distribution of the first electrode unit 911 at each position in the preset area, resulting in the overall movement of the potential distribution in the preset area and finally driving the optical axis of the formed liquid crystal lens to move.

In one embodiment, the conductive line 61 is located outside the functional area of the liquid crystal lens.

In this embodiment, the width of the part of the conductive line 61 of the first electrode unit between the second position 612 and the first position 611 remains unchanged, the length between each leading-out position on the conductive line 62 and the first position 611 is in parabolic correlation or in linear correlation with the distance between each leading-out line 62 and the first position 611 in the preset direction.

For the second electrode unit 912, in this embodiment, when the width of the conductive line 61 of the second electrode unit 912 remains unchanged at each position, the length between each leading-out position on the conductive line 61 of the second electrode unit 912 and the first position of the second electrode unit 912 is in linear correlation with the distance between each leading-out position 62 of the second electrode unit 912 and the first position of the second electrode unit 912 in the preset direction of the electrode unit group 91. The above lengths respectively refer to the length of the part of the conductive line 61 between two positions.

As shown in FIG. 30 and FIG. 2, in this embodiment, the conductive line 61 of the first electrode unit further includes a third position 613, the first position 611 is located between the third position 613 and the second position 612, and at least a part of the leading-out position is located between the second position 612 and the third position 613. The third position 613 of the conductive line 61 in the first electrode layer 20 is used to receive the second driving voltage, and the third position 613 of the conductive line 61 in the second electrode layer 60 is used to receive the fourth driving voltage.

Embodiment 10

Figure 35:
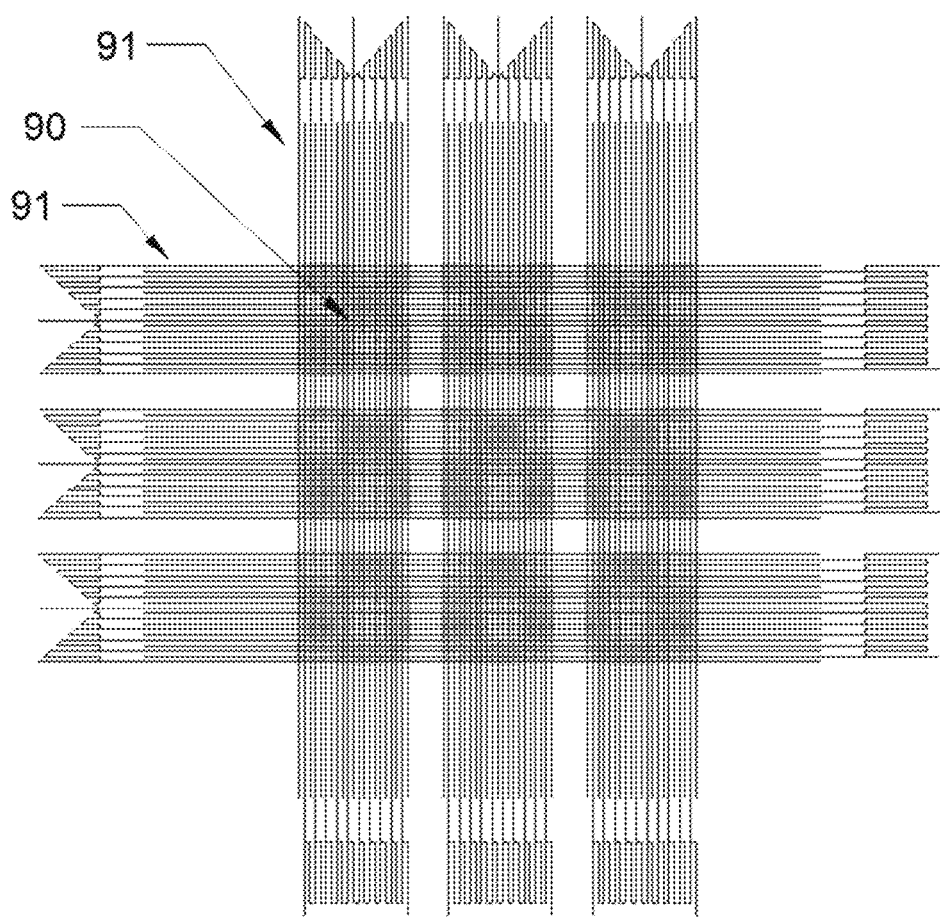
FIG. 35 is a schematic view of a liquid crystal lens array in Embodiment 10.

As shown in FIG. 35, in one embodiment, the present disclosure provides a liquid crystal lens array including the liquid crystal lens 100 described in Embodiment 1, at least one of the first and second electrode layers include at least two electrode unit groups 91. The projection of the leading-out line 62 of the electrode unit group 91 in the first electrode layer on the second reference plane and the projection of the leading-out line 62 of the electrode unit group 91 in the second electrode layer on the second reference plane forms a plurality of overlapping areas 90 arranged in an array, each of which includes at least one of the preset areas.

In this embodiment, one electrode unit group 91 can be arranged in one electrode layer, and two or more electrode unit groups 91 can be arranged in the other electrode layer, or two or more electrode unit groups 91 can be arranged in each electrode layer. Each electrode unit group 91 in the two electrode layers can form a plurality of overlapping areas 90 arranged in an array. In these overlapping areas 90, the potential of the two electrode layers is superimposed on each other, so that the electric field generated by the potential distributed in these areas can drive the deflection of liquid crystal molecules and thus form a plurality of liquid crystal lenses. The second electrode unit 912 in each electrode unit group 91 can be used to control the position of the optical axis of each liquid crystal lens 100.

When the resistance between each leading-out position on the conductive line 61 of each first electrode unit 911 and the first position of the first electrode unit 911 is in parabolic correlation with the distance between each leading-out line 62 of the first electrode unit 911 and the first position of the first electrode unit 911 of the electrode unit group 91 in the preset direction. The potential in each overlapping area 90 is in parabolic distribution.

When the resistance between each leading-out position on the conductive line 61 of the first electrode unit 911 and the first position of the first electrode unit 911 is in linear correlation with the distance between each leading-out position 62 of the first electrode unit 911 and the first position of the first electrode unit 911 of the electrode unit group 91 in the preset direction, the potential in each overlapping area 90 is in conical distribution. In one embodiment, under the condition that the width of the conductive line 61 remains unchanged, the length between each leading-out position and the first position 611 on the conductive line 61 is in parabolic correlation or in linear correlation with the distance between each leading-out line 62 in the first direction and the first position 611. Thus a parabolic liquid crystal lens array or a liquid crystal conical lens array is obtained. An aperture and interval of the liquid crystal lens can be adjusted according to actual needs. With the structure of this embodiment, a potential in accurate parabolic or spherical distribution can be formed in each overlapping area, resulting in a more effective liquid crystal lens array.

Embodiment 11

Figure 36:
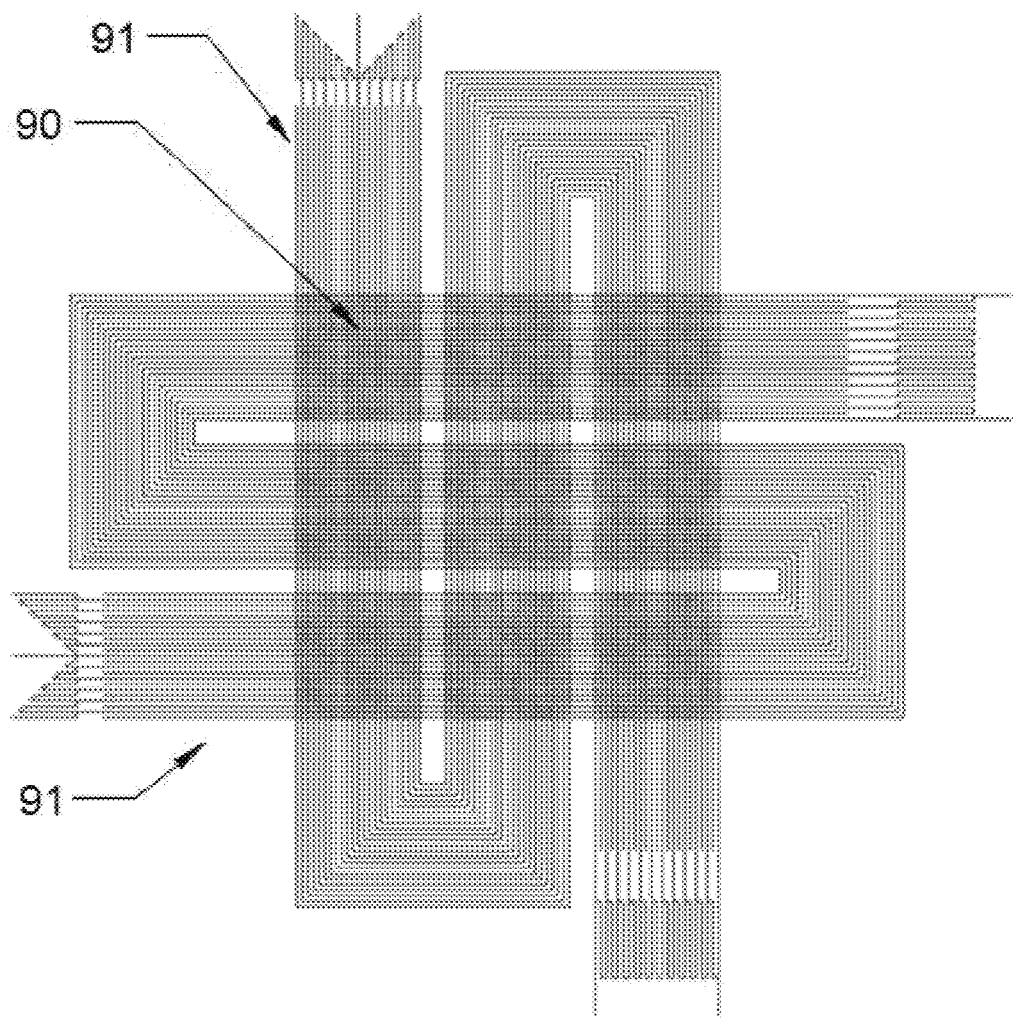
FIG. 36 is a schematic view of a liquid crystal lens array in Embodiment 11.

As shown in FIG. 36, in an embodiment, the present disclosure provides another liquid crystal lens array, including the liquid crystal lens described in Embodiment 1, wherein the leading-out lines 62 of electrode unit group 91 are extended to form a plurality of extension segments. The resistance between each leading-out position and the first position on the conductive line 61 and the distance between at least a part of each extension segment in the preset direction and the first position satisfy the preset condition corresponding to the extension segment. A plurality of overlapping areas 90, which are formed by the projections of the extension segments of the electrode unit group 91 in the first electrode layer on the second reference plane and the projections of the extension segments of the electrode unit group 91 in the second electrode layer on the second reference plane, are arranged in an array. Each overlapping area 90 includes at least one of the preset areas. The leading-out lines 62 of the first electrode unit 911 and the leading-out lines 62 of the second electrode unit 912 are respectively extended to form the extension segments.

In the liquid crystal lens array of this embodiment, the leading-out lines 62 are extended to form the multiple extension segments. Each extension segment can control the potential distribution in the corresponding area, thus driving the liquid crystal molecules in the liquid crystal layer 40 to deflect in the corresponding area. The projections of the extended segments in the two electrode layers on the second reference plane forms the multiple overlapping areas, each of which corresponds to an optical device 100. The potential distribution formed by each extension segment can be the same as each other or different from each other, which is not limited herein. Since the distance between each extension segment and the first position 611 on the conductive line 61 in the first direction is different from each other, even if the potential distribution formed by each extension segment is the same as each other, there is a certain difference in the condition satisfied by the resistance between each leading-out position on the conductor line 61 and the first position 611 and the distance between at least a part of each extension segment in the first direction and the first position 611. Thus, in this embodiment, the condition corresponding to each extension segment can be set separately.

For example, when a parabolic lens array is desired, the above condition corresponding to each extension segment can be: in each overlapping area, the resistance between each leading-out position on the conductive line 61 and the first position 611 is in parabolic correlation with the distance between at least a part of each leading-out line 62 in the first direction and the first position 611 with the offset distance of the extension segment being subtracted therefrom.

Taking the extension segment closest to the first position 611 as the initial extension segment 610 as an example, and the offset distance of a certain extension segment is equal to the distance between the position of the same leading-out line 62 in the first direction and the position of the initial extension segment 610.

Taking the electrode unit including multiple extension segments in FIG. 16 as an example, supposed that three extension segments in FIG. 16 are arranged in an array, namely, an initial extension segment 610, a first extension segment 620 and a second extension segment 630, the offset distance of the first extension segment 620 is d1 and the offset distance of the second extension segment 630 is d2.

When a parabolic lens array is desired, under the condition that the width of the conductive line 61 remains unchanged, the corresponding preset condition can also be set as: the length between each leading-out position and the first position 611 on the conductive line 61 is in parabolic correlation with the distance between each leading-out line 62 and the first position 611 on the preset direction with the offset distance of the extension segment being subtracted therefrom. Similarly, a conical lens can be obtained when the preset condition is set as: the length between each leading-out position and the first position 611 on the conductive line 61 is in parabolic correlation with the distance between each leading-out line 62 and the first position 611 on the preset direction with the offset distance of the extension segment being subtracted therefrom, In each overlapping area 90, besides the extension segments of the leading-out lines 62 of the first electrode unit 911, there are also extension segments of the leading-out lines 62 of the second electrode unit 912. Through the potential of the extension segments of the leading-out lines 62 of the second electrode unit 912, the potential distribution of each liquid crystal lens in the array can be moved as a whole, thereby moving the position of the optical axis of each liquid crystal lens.

The aperture and interval of the liquid crystal lens mentioned above can be adjusted as required.

With the above structure in this embodiment, a potential in accurate parabolic or spherical distribution can be formed in each overlapping area 90, thus obtaining a more effective liquid crystal lens array.

Embodiment 12

In this embodiment, the present disclosure provides a driving method of a liquid crystal lens driver or a liquid crystal lens array, which is used to drive a liquid crystal lens array in Embodiment 9 or in Embodiment 10 or in embodiment 11. The liquid crystal device is a liquid crystal lens, the liquid crystal device array is a liquid crystal lens array, and the first driving voltage, the second driving voltage, the third driving voltage, and the fourth driving voltage are respectively set as $V_1$, $V_2$, $V_3$, and $V_4$. The method includes the following steps:

Step S1, obtaining a liquid crystal linear response voltage range of the liquid crystal lens or the liquid crystal lens array.

The liquid crystal linear response voltage range refers to the voltage range in which a liquid crystal phase delay is in linear correlation with the driving voltage.

Step S2, obtaining a minimum voltage $V_{min}$ and a maximum voltage $V_{max}$ within the liquid crystal linear response voltage range according to the liquid crystal linear response voltage range.

Step S3, adjusting the voltage different between the maximum voltage $V_{max}$ and the minimum voltage $V_{min}$ to adjust an optical power of the liquid crystal lens or the liquid crystal lens array and/or switch the liquid crystal lens or the liquid crystal lens array between a positive lens state and a negative lens state, wherein $V_{min} \leq |V_1 - V_3| \leq V_{max}$, $V_{min} \leq |V_2 - V_4| \leq V_{max}$.

The optical power of the liquid crystal lens or liquid crystal lens array can be adjusted by adjusting the voltage difference between $V_1$ and $V_2$ and the voltage difference between $V_3$ and $V_4$. The liquid crystal lens can be switchable between the positive lens state and the negative lens states by changing the voltage difference between $V_1$ and $V_2$ and the voltage difference between $V_3$ and $V_4$.

In this embodiment, when the overlapping area of the projection of the leading-out line of the first electrode unit and the leading-out line of the second electrode unit on the second reference plane is a rectangular area, the step S3 further includes step as follows.

Step S31, obtaining a length 2a and a width 2b of the rectangular area.

The length 2a and the width 2b of the rectangular area can be equal to each other or different from each other, which is not limited herein. When the length 2a is equal to the width 2b, the overlapping area is a square.

Step S32, determining values of the first driving voltage $V_1$, the second driving voltage $V_2$, the third driving voltage $V_3$ and the fourth driving voltage $V_4$ according to the length 2a and width 2b of the rectangular area, wherein $(V_2-V_1)/a^2 = (V_3-V_4)/b^2$.

In this embodiment, a liquid crystal circular lens or liquid crystal circular lens array can be obtained by using the above driving method.

Embodiment 13

In this embodiment, the present disclosure provides a driving method of a liquid crystal lens or liquid crystal lens array for driving the liquid crystal lens described in Embodiment 9 or the liquid crystal lens array in Embodiment 10 or Embodiment 11. The first driving voltage is set as $V_1$, the second driving voltage as $V_2$, the third driving voltage as $V_3$, the fourth driving voltage as $V_4$, the fifth driving voltage as $V_5$, the sixth driving voltage as $V_6$, the seventh driving voltage as $V_7$, the eighth driving voltage as $V_8$. The projections of the leading-out lines of the electrode unit group in the first electrode layer and the projections of the leading-out lines of the electrode unit group in the second electrode layer on the second reference plane form a rectangular overlapping area. The method includes steps as follows.

Step S01, obtaining a liquid crystal linear response voltage range of the liquid crystal lens or the liquid crystal lens array.

The liquid crystal linear response voltage range refers to the voltage range in which a liquid crystal phase delay is in linear correlation with the driving voltage.

Step S02, obtaining a minimum voltage $V_{min}$ and a maximum voltage $V_{max}$ within the liquid crystal linear response voltage range according to the liquid crystal linear response voltage range.

Step S03, determining a voltage $V_{cen}$ of a position of an optical axis of the liquid crystal lens and a voltage $V_{edg}$ at an edge position of the liquid crystal lens according to the minimum voltage $V_{min}$ and the maximum voltage $V_{max}$, wherein $V_{min} \leq V_{cen} \leq V_{max}$, $V_{min} \leq V_{edg} \leq V_{max}$. The edge position of the liquid crystal lens refers to the position farthest from the optical axis of the liquid crystal lens.

Step S04, obtaining a target position coordinates $(x_o, y_o)$ of the optical axis to which the liquid crystal lens is moved.

The target position coordinate $(x_o, y_o)$ refers to the position of the liquid crystal lens to which the optical axis is moved. A rectangular coordinate system can be established by taking the center of the rectangular area as the coordinate origin, the preset direction as the X-axis, and the direction perpendicular to the preset direction as the Y-axis.

Step S05, obtaining the length 2a and the width 2b of the rectangular area.

Step S06, determining the value of each driving voltage according to the formula:

$$V_2 = -\frac{-a^2 V_1 + 2a^2 V_{cen} - 2a^2 V_{edg} - b^2 V_1}{a^2 + b^2}$$

$$V_4 = -\frac{-a^2 V_3 - b^2 V_3 - 2b^2 V_{cen} + 2b^2 V_{edg}}{a^2 + b^2}$$

$$V_6 = -\frac{-a^2 V_5 - 8a V_{cen} x_o + 8a V_{edg} x_o - b^2 V_5}{a^2 + b^2}$$

$$V_7 = -\frac{1}{a^2+b^2}\begin{pmatrix} -a^2 V_1 + a^2 V_3 - a^2 V_5 + 2a^2 V_{cen} - 4a V_{cen} x_o + 4a V_{edg} x_o \\ -b^2 V_1 + b^2 V_3 - b^2 V_5 + 2b^2 V_{cen} - 4b V_{cen} y_o + 4b V_{edg} y_o \\ -2V_{cen} x_o^2 - 2V_{cen} y_o^2 + 2V_{edg} x_o^2 + 2V_{edg} y_o^2 \end{pmatrix}$$

$$V_8 = -\frac{1}{a^2+b^2}\begin{pmatrix} -a^2 V_1 + a^2 V_3 - a^2 V_5 + 2a^2 V_{cen} - 4a V_{cen} x_o + 4a V_{edg} x_o \\ -b^2 V_1 + b^2 V_3 - b^2 V_5 + 2b^2 V_{cen} + 4b V_{cen} y_o - 4b V_{edg} y_o \\ -2V_{cen} x_o^2 - 2V_{cen} y_o^2 + 2V_{edg} x_o^2 + 2V_{edg} y_o^2 \end{pmatrix}$$

Wherein $V_1$, $V_3$, $V_5$ can be set according to actual needs.

Figure 37:
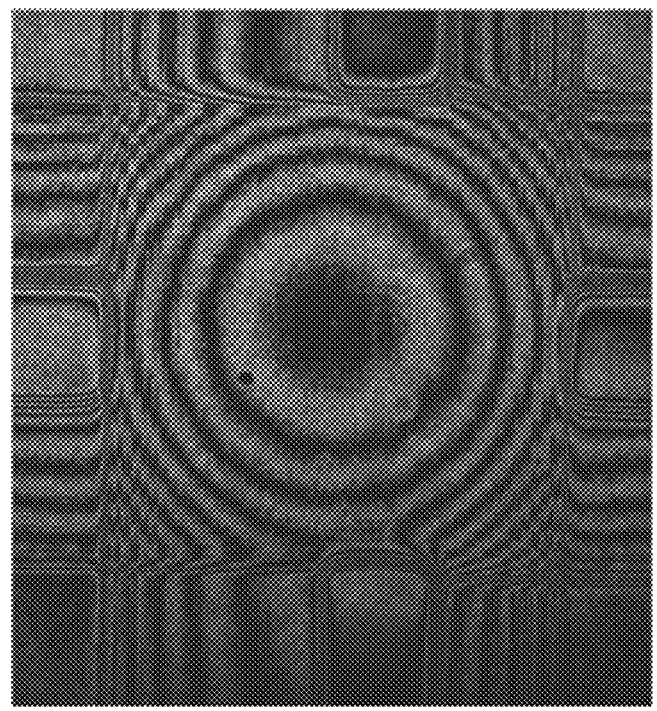
FIG. 37 is a schematic view showing the interference pattern of the liquid crystal lens before the optical axis thereof is moved.
Figure 38:
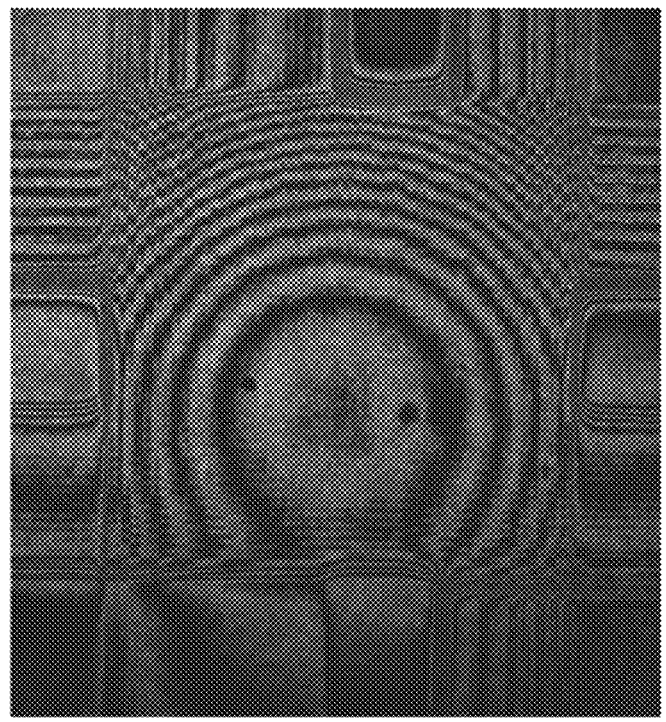
FIG. 38 is a schematic view showing the interference pattern of the liquid crystal lens after the optical axis thereof is moved to a certain position.
Figure 39:
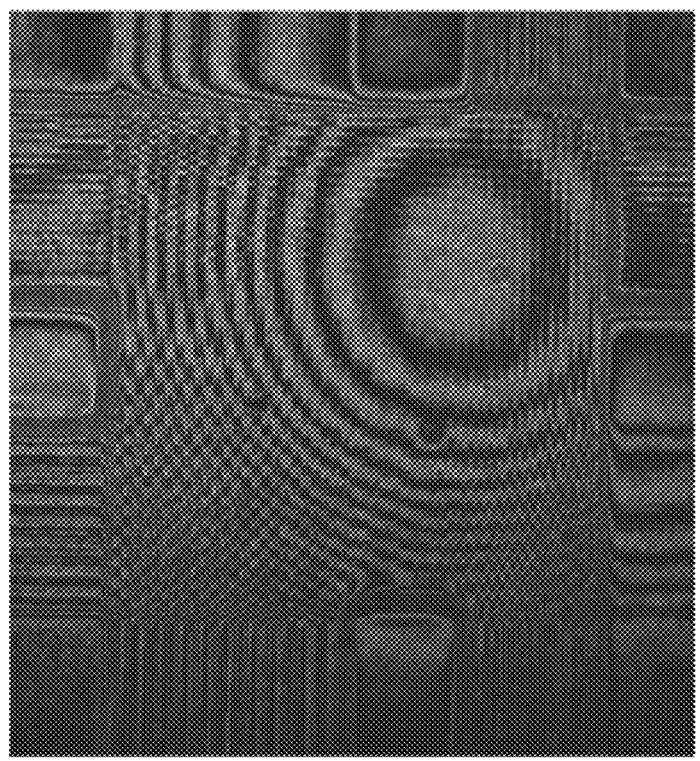
FIG. 39 is schematic view showing the interference pattern of the crystal lens after the optical axis thereof is moved to another position.

In this step, the values of $V_1$, $V_3$ and $V_5$ are randomly selected, and then the remaining five driving voltages are calculated according to the above formula according to the length 2a and the width 2b of the rectangular area, the voltage $V_{cen}$ at the position of the optical axis of the liquid crystal lens, the voltage $V_{edg}$ at the edge position of the liquid crystal lens, and the target position coordinate $(x_o, y_o)$. The optical axis of the liquid crystal lens can be moved to the target position by applying the corresponding voltage to each conductive line after the value of each driving voltage is determined The effect of the movement of the optical axis is shown in FIG. 37 to FIG. 39. It can be seen from FIGS. 37 and 38 that the optical axis of the liquid crystal lens moves down to the position in FIG. 38 from the position in FIG. 37. It can be seen from FIG. 37 and FIG. 39 that the optical axis of the liquid crystal lens moves from the position in FIG. 37 to the upper right position in FIG. 39.

Embodiment 14

In this embodiment, the present disclosure provides an electronic product including a control circuit and a liquid crystal optical device described in any of Embodiment 1. The control circuit is electrically connected to the liquid crystal optical device or a liquid crystal optical device array. The electronic products include but are not limited to an imaging device, a display device, a mobile phone, a AR device, a VR device, a naked eye 3D product, a wearable device, etc.

The above descriptions are only optional embodiments of the application, and do not limit the scope of the patents of the present application. All the equivalent structural transformations made by the content of the specification and drawings of the present application under the creative concept of the present application, or directly/indirectly used in other related technical fields are all comprised in the protection scope of the patents of the present application.

What is claimed is:

1. A liquid crystal optical device, wherein the liquid crystal optical device comprises a liquid crystal layer, a first orientation layer, a second orientation layer, a first electrode layer, a second electrode layer, a first transparent substrate, and a second transparent substrate; the first orientation layer and the second orientation layer are respectively located on opposite sides of the liquid crystal layer, the first electrode layer is located on one side of the first orientation layer facing away from the liquid crystal layer; and the second electrode layer is located on one side of the second orientation layer facing away from the liquid crystal layer; the first transparent substrate is located on one side of the first electrode layer facing away from the liquid crystal layer, and the second transparent substrate is located on one side of the second electrode layer facing away from the liquid crystal layer;

the first electrode layer is a planar electrode, or the first electrode layer comprises an electrode unit, or the first electrode layer comprises an electrode unit group;

the second electrode layer comprises a conductive line and a plurality of leading-out lines, the conductive line comprises a first position and a second position different from the first position for receiving driving voltages; one end of each of the leading-out lines is connected with the conductive line, the other end thereof is relatively suspended; a position of the conductive line at which the conductive line is connected to each leading-out line is a leading-out position; at least a part of the leading-out position is located between the first position and the second position of the conductive line, and at least two of the leading-out positions are different from each other; a resistance between each leading-out position on the conductive line and the first position and a distance between at least a part of each leading-out line in a first direction and the first position satisfies a first condition.

2. The liquid crystal optical device of claim 1, wherein the first electrode layer is a planar electrode, the first position and the second position of the conductive line in the second electrode layer are respectively configured to receive a first driving voltage and a second driving voltage.

3. The liquid crystal optical device of claim 1, wherein the second electrode layer comprises an electrode unit, the electrode unit comprises the conductive line and the plurality of leading-out lines in the second electrode layer, the resistance between each leading-out position on the conductive line and the first position and the distance between at least a part of each leading-out line in a preset direction of the electrode unit and the first position satisfy a preset condition;

the first electrode layer comprises an electrode unit, the electrode unit comprises a conductive line and a plurality of leading-out lines, the conductive line comprises a first position and a second position different from the first position, one end of the leading-out line is connected with the conductive line, and the other end thereof is relatively suspended; a position of the conductive line at which the conductive line is connected with each leading-out line is a leading-out position, at least a part of the leading-out position is located between the first position and the second position of the conductive line, and at least two leading-out positions are different from each other; a resistance between each leading-out position on the conductive line and the first position and a distance between at least a part of each leading-out line in a preset direction of the electrode unit and the first position satisfy the preset condition; and the preset direction of the electrode unit in the first electrode layer is different from the preset direction of the electrode unit in the second electrode layer;

the first position and the second position of the conductive line in the first electrode layer are respectively configured to receive a first driving voltage and a second driving voltage;

the first position and the second position of the conductive line in the second electrode layer are respectively configured to receive a third driving voltage and a fourth driving voltage.

4. The liquid crystal optical device of claim 1, wherein the second electrode layer comprises an electrode unit group having a first electrode unit and a second electrode unit, the first electrode unit and the second electrode unit of the second electrode layer respectively comprise the conductive line and the plurality of leading-out lines;

the first electrode layer comprises an electrode unit group having a first electrode unit and a second electrode unit, the first electrode unit and the second electrode unit of the first electrode layer respectively comprise a conductive line and a plurality of leading-out lines; the conductive line comprises a first position and a second position different from the first position; one end of each leading-out line is connected with the conductive line, and the other end thereof is relatively suspended; a position of the conductive line at which the conductive line is connected with each leading-out line is a leading-out position; at least a part of the leading-out position is located between the first position and the second position of the conductive line, and at least two leading-out positions are different from each other;

each leading-out line in at least one preset area of the electrode unit group of the first electrode layer and the second electrode layer is straight and perpendicular to a preset direction; and in the preset area, a resistance between each leading-out position on the conductive line of the first electrode unit and the first position of the first electrode unit is in parabolic correlation or in linear correlation with a distance between each leading-out line of the first electrode unit in the preset direction of the electrode unit group and the first position of the first electrode unit; a resistance between each leading-out position on the conductive line of the second electrode unit and the first position of the second electrode unit is in linear correlation with a distance between each leading-out line of the second electrode unit in the preset direction of the electrode unit group and the first position of the second electrode unit;

a projection of the preset area of the first electrode layer on a second reference plane and a projection of the preset area of the second electrode layer on the second reference plane are partially overlapped, and the second reference plane is parallel to the leading-out line of the first electrode unit and the leading-out line of the second electrode unit; the preset direction of the electrode unit group in the first electrode layer is perpendicular to the preset direction of the electrode unit group in the second electrode layer;

the first position and the second position of the conductive line of the first electrode unit in the first electrode layer are respectively configured to receive a first driving voltage and a second driving voltage, the first position and the second position of the conductive line of the second electrode unit in the first electrode layer are respectively configured to receive a fifth driving voltage and a sixth driving voltage;

the first position and the second position of the conductive line of the first electrode unit in the second electrode layer are respectively configured to receive a third driving voltage and a fourth driving voltage; the first position and the second position of the conductive line of the second electrode unit in the second electrode layer are respectively configured to receive a seventh driving voltage and an eighth driving voltage.

5. The liquid crystal optical device of claim 1, wherein the conductive line also comprises a third position, the first position is located between the third position and the second position, the third position of the conductive line is configured to receive a second driving voltage, and at least a part of the leading-out position is located between the second position and the third position.

6. The liquid crystal optical device of claim 5, wherein a width of a part of the conductive line between the second position and the third position remains unchanged, and a length between each leading-out position and the first position and a distance between at least a part of each leading-out line in the first direction and the first position satisfy a second condition.

7. The liquid crystal optical device of claim 6, wherein the second condition is that the length between each leading-out position and the first position is in parabolic correlation with the distance between at least a part of each leading-out line in the first direction and the first position, or the length between each leading-out position and the first position is proportional to the distance between at least a part of each leading-out line in the first direction and the first position.

8. The liquid crystal optical device of claim 5 further comprising a first electrical connector, and the first electrical connector is connected with the conductive line in the first position;

the conductive line comprises a first subpart located between the first position and the second position and a second subpart located between the first position and the third position, the first subpart and the second subpart are respectively located on opposite sides of the first electrical connector.

9. The liquid crystal optical device of claim 1, wherein each of the leading-out lines comprise a first part and a second part respectively located on opposite sides of a reference plane, and the conductive line is located on the same side as the first part or the second part of the reference plane, and the reference plane passes through the first position and is perpendicular to the first direction.

10. The liquid crystal optical device of claim 1, wherein the leading-out line comprises the first group of leading-out lines and a second group of leading-out lines, the first group of leading-out lines extends outwards from the conductive line to a first area, and the second group of leading-out lines extends outward from the conductive line to a second area, and the first area and the second area are distributed on opposite sides of a reference plane respectively; the reference plane passes through the first position and is perpendicular to the first direction, and the conductive line is located in the first area or the second area.

11. The liquid crystal optical device of claim 1, wherein the first condition is that the resistance between each leading-out position on the conductive line and the first position is in parabolic correlation with a distance between at least a part of the leading-out line in the first direction and the first position; or the resistance between each leading-out position on the conductive line and the first position is proportional to a distance between at least a part of each leading-out line in the first direction and the first position.

12. The liquid crystal optical device of claim 1, wherein a width of a part of the conductive line between the first position and the second position remains unchanged, and a length between each leading-out position and the first position and a distance between at least a part of each leading-out line in the first direction and the first position satisfy a second condition.

13. The liquid crystal optical device of claim 1, wherein the leading-out lines are parallel to each other in at least one area, and the part of each leading-out line satisfying the first conduction is at least partially located in the area.

14. The liquid crystal optical device of claim 1, wherein a projection of the conductive line on a plane parallel to the second electrode layer and a projection of the planar electrode on the plane parallel to the second electrode layer are not overlapped.

15. The liquid crystal optical device of claim 1, wherein the conductive line is located outside a functional area of the liquid crystal optical device.

16. The liquid crystal optical device of claim 1, wherein a high resistance film or a high dielectric constant layer is arranged between the second electrode layer and the second orientation layer or between the second electrode layer and the second transparent substrate.

17. A liquid crystal optical device array, wherein the liquid crystal optical device array comprises a plurality of the liquid crystal optical devices of claim 1 arranged in an array.

18. A liquid crystal optical device array, wherein the liquid crystal optical device array comprises a plurality of the liquid crystal optical devices of claim 1, the leading-out lines of the liquid crystal optical device are extended to form a plurality of extension segments arranged in an array; a resistance between each leading-out position and the first position on the conductive line and the distance between at least a part of each extension segment in the first direction and the first position satisfy the condition corresponding to the extension segment.

19. An electronic product, wherein the electronic product comprises a control circuit and the liquid crystal optical device of claim 1, and the control circuit is electrically connected to the liquid crystal optical device or a liquid crystal optical device array having a plurality of the liquid crystal optical devices.

20. A driving method of a liquid crystal optical device or a liquid crystal lens array applied to drive the liquid crystal optical device of claim 1; the liquid crystal optical device is a liquid crystal lens; a first driving voltage is set as $V_1$ and a second driving voltage as $V_2$; the driving method comprises the following steps:

step S1, obtaining a liquid crystal linear response voltage range of the liquid crystal lens or the liquid crystal lens array;

step S2, obtaining a minimum voltage $V_{min}$ and a maximum voltage $V_{max}$ within a liquid crystal linear response voltage range according to the liquid crystal linear response voltage range;

step S3, adjusting a voltage difference between $V_1$ and $V_2$ according to the minimum voltage $V_{min}$ and the maximum voltage $V_{max}$ to adjust an optical power of the liquid crystal lens or the liquid crystal lens array and/or switch the liquid crystal lens or the liquid crystal lens array between a positive lens state and a negative lens states, wherein $V_{min} \leq V_1 \leq V_{max}$ and $V_{min} \leq V_2 \leq V_{max}$.

* * * * *